United States Patent
Berg

(10) Patent No.: US 10,226,825 B2
(45) Date of Patent: Mar. 12, 2019

(54) TOOL HOLDING APPARATUS

(71) Applicant: Charles Michael Berg, Forest Lake, MN (US)

(72) Inventor: Charles Michael Berg, Forest Lake, MN (US)

( * ) Notice: Subject to any disclaimer, the term of this patent is extended or adjusted under 35 U.S.C. 154(b) by 37 days.

(21) Appl. No.: 15/356,632

(22) Filed: Nov. 20, 2016

(65) Prior Publication Data

US 2018/0141132 A1    May 24, 2018

(51) Int. Cl.
| | |
|---|---|
| *B23C 5/26* | (2006.01) |
| *B23B 31/02* | (2006.01) |
| *B23Q 11/10* | (2006.01) |
| B23B 31/00 | (2006.01) |
| B23B 31/11 | (2006.01) |

(52) U.S. Cl.
CPC .............. *B23C 5/26* (2013.01); *B23B 31/02* (2013.01); *B23Q 11/1023* (2013.01); *B23B 31/005* (2013.01); *B23B 31/11* (2013.01); *B23B 2231/0256* (2013.01); *B23B 2231/24* (2013.01); *B23B 2250/12* (2013.01); *Y10T 279/17111* (2015.01); *Y10T 409/30952* (2015.01); *Y10T 409/304032* (2015.01)

(58) Field of Classification Search
CPC ............... B23C 5/26; B23Q 11/1023; Y10T 409/304032; Y10T 409/30952; Y10T 409/309408; Y10T 279/17111; B23B 31/02

See application file for complete search history.

(56) References Cited

U.S. PATENT DOCUMENTS

| | | |
|---|---|---|
| 3,643,546 A | 2/1972 | Richter et al. |
| 4,582,461 A | 4/1986 | Ziegelmeyer |
| 4,602,798 A | 7/1986 | Wettstein |
| 4,642,005 A | 2/1987 | Kondo et al. |
| 4,643,623 A | 2/1987 | Kondo et al. |
| 4,822,220 A | 4/1989 | Danielsson et al. |
| 5,011,346 A | 4/1991 | Pfalzgraf |
| 5,028,178 A | 7/1991 | Ronen |
| 5,460,388 A | 10/1995 | Lewis et al. |
| 5,911,421 A | 6/1999 | Steele |
| 6,077,003 A | 6/2000 | Laube |

(Continued)

FOREIGN PATENT DOCUMENTS

| | | | |
|---|---|---|---|
| DE | 3136149 A1 | 3/1983 | |
| DE | 102007012487 A1 * | 9/2008 | ............. B23B 31/02 |

(Continued)

*Primary Examiner* — Eric A Gates
(74) *Attorney, Agent, or Firm* — Michael A. Mochinski

(57) ABSTRACT

A tool holding apparatus for interfacing a machine spindle receiver of a milling machine, which includes a holder nose connected to a holder body configured with a first divided section integrally connecting to a second divided section and a centralized axial bore for housing therewithin a tension bolt, a lock nut, and a thrust nut. The holder nose includes an axial bore incorporating a reverse-tapered configuration and three flat sectors to correspond with an equally configured shaft portion of a tool, whereupon the threaded attachment of the thrust nut to the holder nose furthers a locking arrangement of the tool within the axial bore to prevent inadvertent axial and rotational movement thereof during aggressive milling operations.

53 Claims, 16 Drawing Sheets

(56) References Cited

U.S. PATENT DOCUMENTS

| | | |
|---|---|---|
| 6,186,712 B1 | 2/2001 | Senzaki |
| 6,224,303 B1 | 5/2001 | Wheeler et al. |
| 6,305,696 B1 | 10/2001 | Sugata et al. |
| 6,343,901 B2 | 2/2002 | Wheeler et al. |
| 6,371,705 B1 | 4/2002 | Gaudreau |
| 6,572,119 B2 | 6/2003 | Selb |
| 6,640,679 B1 | 11/2003 | Roberts, Jr. |
| 6,726,412 B2 * | 4/2004 | Sugata ............... B23Q 11/1023 279/20 |
| 6,926,478 B2 * | 8/2005 | Sugata ............... B23Q 11/1015 408/58 |
| 7,048,481 B2 * | 5/2006 | Sugata ............... B23Q 11/1023 408/56 |
| 7,156,589 B2 | 1/2007 | Sugata et al. |
| 7,160,067 B2 | 1/2007 | Perry et al. |
| 7,186,064 B1 | 3/2007 | Erickson et al. |
| 7,192,228 B2 * | 3/2007 | Haenle ................ B23B 31/028 279/156 |
| 7,320,568 B2 | 1/2008 | Matsumoto et al. |
| 7,628,571 B2 | 12/2009 | Chen |
| 7,785,046 B2 | 8/2010 | Beckington |
| 7,896,591 B2 | 3/2011 | Stoll et al. |
| 8,678,724 B2 * | 3/2014 | Lee .................... B23Q 11/1023 279/20 |
| 8,714,893 B2 | 5/2014 | Taguchi et al. |
| 9,028,181 B2 * | 5/2015 | Herud ................. B23B 31/028 279/156 |
| 9,061,355 B2 * | 6/2015 | Pappu .................... B23B 31/02 |
| 9,555,478 B2 * | 1/2017 | Matheis ................ B23B 31/028 |
| 2005/0089382 A1 | 4/2005 | Stojanovski |
| 2012/0189397 A1 * | 7/2012 | Bozkurt ................. B23B 31/02 409/135 |
| 2013/0195576 A1 * | 8/2013 | Jaffe ................... B23Q 11/1023 409/231 |

FOREIGN PATENT DOCUMENTS

| | | | | |
|---|---|---|---|---|
| EP | 0820826 A1 | | 1/1998 | |
| EP | 2412463 A1 * | | 2/2012 | ........... B23B 31/006 |
| JP | 11099441 A * | | 4/1999 | ........... B23B 31/001 |
| JP | 2001287135 A * | | 10/2001 | ........ B23Q 11/1023 |
| WO | WO 96/04090 A1 | | 2/1996 | |
| WO | WO 2004067213 A1 * | | 8/2004 | ........... B23B 31/008 |
| WO | WO 2012/113621 A1 | | 8/2012 | |

* cited by examiner

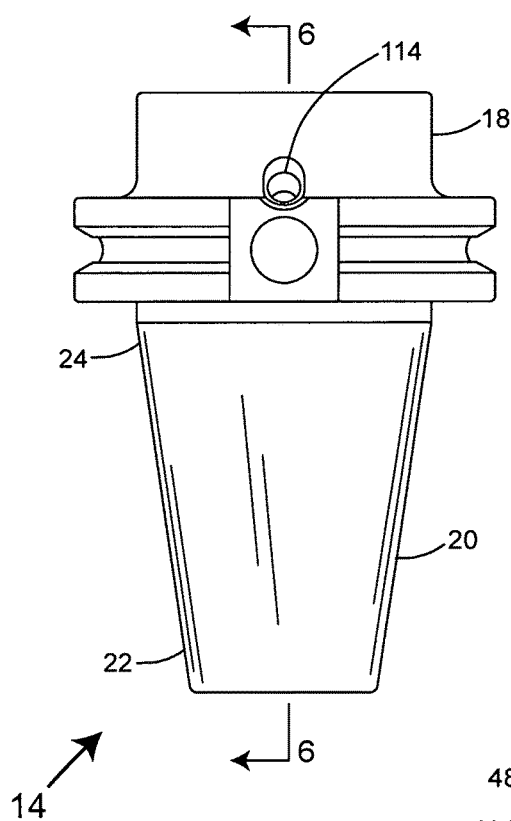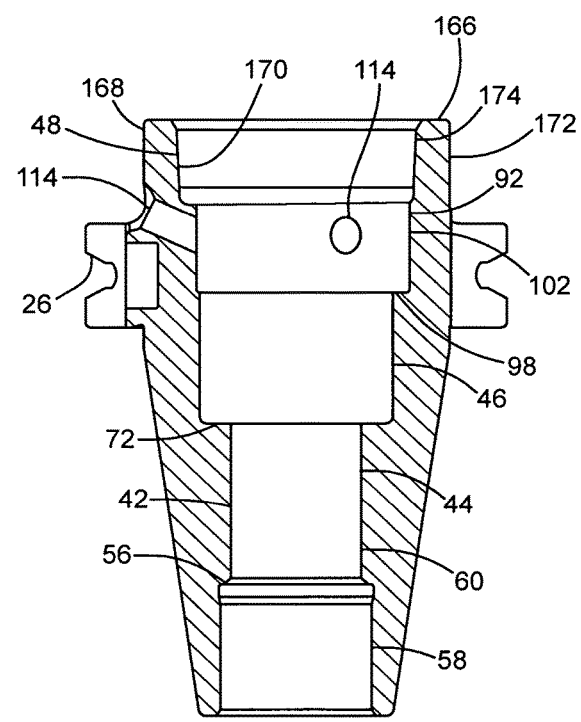

TOOL HOLDING APPARATUS

FIELD OF THE INVENTION

The present invention is generally directed to a tool holding apparatus for use with and placement within a machine spindle commonly associated with a CNC milling machine. More specifically, the tool holding apparatus relates to an improvement of a tool clamping mechanism that appreciably eliminates axial rotation and axial pullout of an end mill that can adversely diminish the precision by which the end mill shapes and mills a stock of material.

BACKGROUND OF THE INVENTION

Computer numerical controlled or CNC machines are sophisticated metalworking tools that can generate intricate parts required by modern day technology. The CNC term refers to a large group of machines that utilize computer logic to control movements of a cutting head or spindle or even the work piece itself to fulfill the metalworking task. CNC machines may commonly include milling machines, lathes, and grinders.

Milling machines, for example, automatically cut materials, including metal and today's advanced carbon composites, using a machine spindle affixed with a milling cutter, which can effectively move to different positions and depths as directed by the computer instructions. The milling cutter is a rotary cutting tool, often comprising multiple cutting points, and typically travels perpendicular to its axis so that the cutting action primarily occurs relatively about the circumference of the milling cutter. As the milling cutter enters the work piece, the cutting edges, generally in the form of flutes or teeth, repeatedly cut into and exit from the material, such to emit chips or a spring-like swarf therefrom with each working pass. The cutting action in this regard is often referred to as shear deformation.

Nearly all milling machines, from the oldest manual machines up to the most modern CNC machines, utilize tooling that is piloted on a tapered surface. The machine taper is a simple, low-cost, highly repeatable, and versatile tool mounting system that utilizes a tool holder with a progressively tapered shank and a geometrically matching socket interiorly present in the machine spindle. In most cases, the tool holder is retained within the spindle's socket by means of a frictional force. However, in some cases, the milling machine spindle may unduly experience an increased load that can perhaps overwhelm the holding frictional force. Accordingly, it is appropriate to use a drawbar, which is essentially a long bolt that retains the tool holder within the spindle's socket by means of establishing a sufficient amount of upward force that overcomes the transverse force component that would otherwise cause the tool holder to wobble out of the spindle's socket.

In generally all instances of CNC machine usage, it is vital that the interchangeable interface between a machine spindle and a cutting tool is efficiently maintained so as not to deleteriously impact the accurate milling of materials. Accordingly, in fulfilling the requisite amount of efficiency, it is appropriate to evaluate four factors: (1) the rotational axis of the machine spindle and cutting tool to ensure a high degree of concentricity in relation to each, (2) the cutting tool's position and hold within the tool holder to resist unwanted rotational motion therewithin and axial pullout therefrom, (3) the consistency by which the tool holder is fabricated from manufacturer to manufacturer, which can be effectively addressed by the application and use of gages that have become standardized in the industry, and (4) the degree by which the tool holder is relatively balanced with respect to the machine spindle.

Industrial manufacturers of tool holders, for instance, have made numerous efforts to satisfactorily develop tool holders addressing the efficiency requirements duly noted above, but generally in view of making tradeoffs among cost, versatility of use, long-term accuracy, and maintenance.

For instance, industry has come to popularize and accept standard collets that allow the tool holder to be more readily adaptable to a variety of cutting tool diameters while yielding a moderate degree of concentricity, at least initially. Generally, the standard collet can be described as comprising a tubular body formed from a plurality of elongated, flexible steel members. The members are separated by longitudinal slots that impart some degree of radial flexibility to the collet so as to further advance a grip on the cutting tool's shank. Adjacent gripping members are interconnected by an alternating pattern of metal webs to form a singular collet body. In the manner of operation, the collet body is inserted in a complementary-shaped opening in a collet chuck so that an exposed portion thereof extends beyond the collet chuck. An annular collet nut having an inner diameter screw thread that corresponds to an outer diameter screw thread on the collet chuck is then placed over the collet chuck and exposed portion of the collet body. The collet nut includes a nose ring with a frustro-conical cam surface that engages the exposed portion of the collet body and squeezes it radially inward as the collet nut is tightly screwed onto the collet chuck. The radial compression that the collet nut applies to the exposed portion of the collet body flexes the body inwardly, appreciably creating a sufficient gripping force to retain placement of the cutting tool's shank within the inner diameter of the collet body.

Although the collet nut and associated tapers of the collet and collet chuck portion of the tool holder may adequately compress and clamp the cutting tool's shank within the collet body, the strength with which the collet clamps the cutting tool may become unduly compromised by the applied rotational force and rotational resistance that may be realized when the cutting tool engagingly shears the work piece during milling operations. Since the respective shapes of the cutting tool's shank and the inner portion of the collet body of the tool holder are inherently cylindrical by design, there is an appreciable tendency for rotational slip of the cutting tool relatively within the tool holder, particularly under a condition of high operating torque for a sustained period of time during rigorous milling operations. Consequently, unwanted rotational interaction of this kind can adversely cause axial pullout of the cutting tool from the tool holder, leading to possible damage to the tool holder, machine spindle, cutting tool, and/or work piece, and/or further an unbalanced tool holder, resulting in unwanted vibrations that can create chatter and ultimately diminish the surface finish of the work piece and the life of the cutting tool. Accordingly, to avoid rotational slip and axial pullout in the manner described herein, feed rates and operational RPM must be unduly adjusted or restricted to the point of possibly becoming impractical, and in today's fast paced manufacturing environment, this becomes even more of a concern. Therefore, an improved form of machine tool holding apparatus that prevents tool rotation and axial pullout is particularly desired in this respect.

Although the usage of a tool holder incorporating a collet may be satisfactory in some regards, particularly where variability thereof is required to accommodate the variety of cutting tools being offered by and used in the industry, industry has come to recognize other forms of tool holders that sufficiently overcome the deficiencies associated with collets, but perhaps compromising in areas of versatility of use and expense.

For instance, tool holders that incorporate clamping mechanisms in the form of hydraulics or heat shrinking, can effectively eliminate the use of the collet arrangement described above and achieve a relative amount of holding power with a high degree of concentricity. This is generally made possible by the nature of the unibody structure of the tool holder that is fabricated to an overall tight tolerance to further a low run-out to improve tool precision, surface finish, and productivity.

Hydraulic tool holders, for example, incorporate a bladder of hydraulic fluid that fulfill clamping upon the tool's shank with two supports on each side (fulcrums); tool change out is made possible by means of tightening and loosening a set screw with a dedicated torque wrench that respectively pressurizes and depressurizes the bladders. Although a relative degree of concentricity is realized with a fulfilling option for tool change out to accommodate a variety of cutting tool diameters, possibly to the likes of the collet arrangement, there continues to be an undesirable opportunity for axial slip and pullout of the cutting tool. A shrink fit tool holder, on the other hand, can offer an appreciable amount of clamping force upon the tool's shank while maintaining a high degree of concentricity, as it relies on the heating and cooling of the tool holder's metal construction to take advantage of thermal expansion and contraction that respectively holds and releases the cutting tool within and from the tool holder. Although a shrink-fit tool holder provides a simple yet highly accurate and repeatable grip on the cutting tool, it generally suffers in the area of versatility given that the cutting tool is generally dedicated to the tool holder unless provisions are made to purchase, operate and maintain a heat-shrink machine that can accommodate periodic change out of the cutting tool, which can be a time consuming and costly and expensive option in the long term.

Accordingly, there remains a need for a simple, yet cost effective tool holding apparatus that incorporates an internal clamping mechanism that aims to eliminate any undesirable opportunity for axial rotation and axial pullout that can unduly diminish the precision and accuracy by which the cutting tool shapes and mills a stock of material, while simultaneously maintaining a high degree of concentricity relatively to the centerline of the machine spindle that is accurate to a level of run out error appropriate to the cutting tool and the machining process.

BRIEF SUMMARY OF THE INVENTION

In order to overcome the numerous drawbacks apparent in the prior art, a tool holding apparatus has been devised for use with a machine spindle of the type commonly associated with CNC milling machines, particularly incorporating use of an internal clamping mechanism that effectively eliminates axial rotation and axial pullout of an end mill that can appreciably diminish the precision and accuracy by which the end mill shapes and mills a stock of material.

It is an object of the present invention to provide a tool holding apparatus that incorporates within its structure centralized and through-wall coolant and lubricant passageways to further effect cooling and lubricating of raw materials undergoing sustained and rigorous milling.

It is a further object of the present invention to provide a tool holding apparatus that is relatively simple in terms of design and construction and exists as two separable but connected main components for increased accessibility for periodic repair and maintenance while maintaining its overall, inherent concentricity characteristics.

It is yet another object of the present invention to provide a tool holding apparatus that maintains a high degree of concentricity relatively to the centerline of the machine spindle that is accurate to a level of run out error appropriate to an end mill and the machining process.

It is a further object of the present invention to provide a tool holding apparatus that does not necessarily depend on the use of expensive externally operated equipment or devices that may pose a threat to the health and safety of the operator.

It is yet a further object of the present invention to provide a tool holding apparatus that incorporates within its design a holder body having alternative configurations recognizable as conforming to industrial specifications and standards for fitment within a machine spindle receiver of a CNC milling machine of the type generally available and used in the art.

In accordance with the present invention a tool holding apparatus has been devised for use with a machine spindle receiver of the type commonly associated with a CNC milling machine, the tool holding apparatus principally comprising a holder nose connected to a holder body having a radially projecting v-flange separating first and second divided sections; the second divided section comprising a geometric arrangement for conforming fitment within the machine spindle receiver; the holder body comprises a centralized axial bore having first, second, and third internal cylindrical sections for housing therewithin an internal assembly comprising a tension bolt, a lock nut, and a thrust nut; the second internal cylindrical section primarily houses a thrust slip washer positioned on a distal side of a lock nut and a stacked arrangement of spring washers on a proximal side of the lock nut; the third internal cylindrical section partially houses the thrust nut having a first outward cylindrical surface geometrically configured with three flat segments that correspond to an equally configured first chamber of the third internal cylindrical section to inhibit rotational motion relatively therewithin, a second outward cylindrical surface configured with a threaded end to threadably engage an internal threaded bore of the holder nose that furthers to seat and retain an end mill under a torque load within an axial bore generally associated with the holder nose, and an inner threaded bore that threadably receives a threaded end section of the tension bolt that upon its rotation in a clockwise manner draws inwardly the position of the holder nose relatively towards the holder body and concentrically aligns and tightly secures the holder nose sufficiently to the holder body; the axial bore comprises a reverse-tapered configuration formed by the progressive change in diameter between rearward and forward ends thereof and three flat sectors integrated within the tapered configuration; and the end mill comprises a cutter end section integrally connecting to a shaft portion configured with a reverse-tapered profile and three flat trigonal sectors each being equally spaced apart from one another about an outer peripheral surface of the reverse-tapered profile to form an overall trigonal tapered configuration sufficiently suited to fit within the equally configured axial bore, collectively surmounting to inhibit axial rotation and axial pullout of the end mill relatively from the holder nose for more accurate and precise milling of materials.

Other objects, features, and advantages of the present invention will become apparent in the following detailed description of the preferred embodiments thereof when read in conjunction with the accompanying drawings in which like reference numerals depict the same parts in the various views.

BRIEF DESCRIPTION OF THE SEVERAL VIEWS OF THE DRAWINGS

A preferred embodiment of the present invention will now be described by way of example with reference to the accompanying drawings, in which:

FIG. 5 is a side elevational view of the preferred embodiment of the present invention illustrating a holder body having integral interfacing means with a radially projecting v-flange separating first and second divided sections;

FIG. 6 is a cross sectional view of the preferred embodiment of the present invention taken along lines 6-6 in FIG. 5 illustrating a holder body having integral interfacing means and a centralized axial bore configured with first, second, and third internal cylindrical sections concentrically aligned with one another;

DETAILED DESCRIPTION OF THE INVENTION

While this invention is susceptible of being embodied in many different forms, the preferred embodiment of the invention is illustrated in the accompanying drawings and described in detail hereinafter with the understanding that the present disclosure purposefully exemplifies the principles of the present invention and is not intended to unduly limit the invention to the embodiments illustrated and presented herein. The present invention has particular utility as a tool holding apparatus that appreciably eliminates rotational slip and axial pullout of an end mill therefrom for more accurate and efficient milling of materials commonly used in the manufacture and fabrication of finished parts and components.

Figure 1:
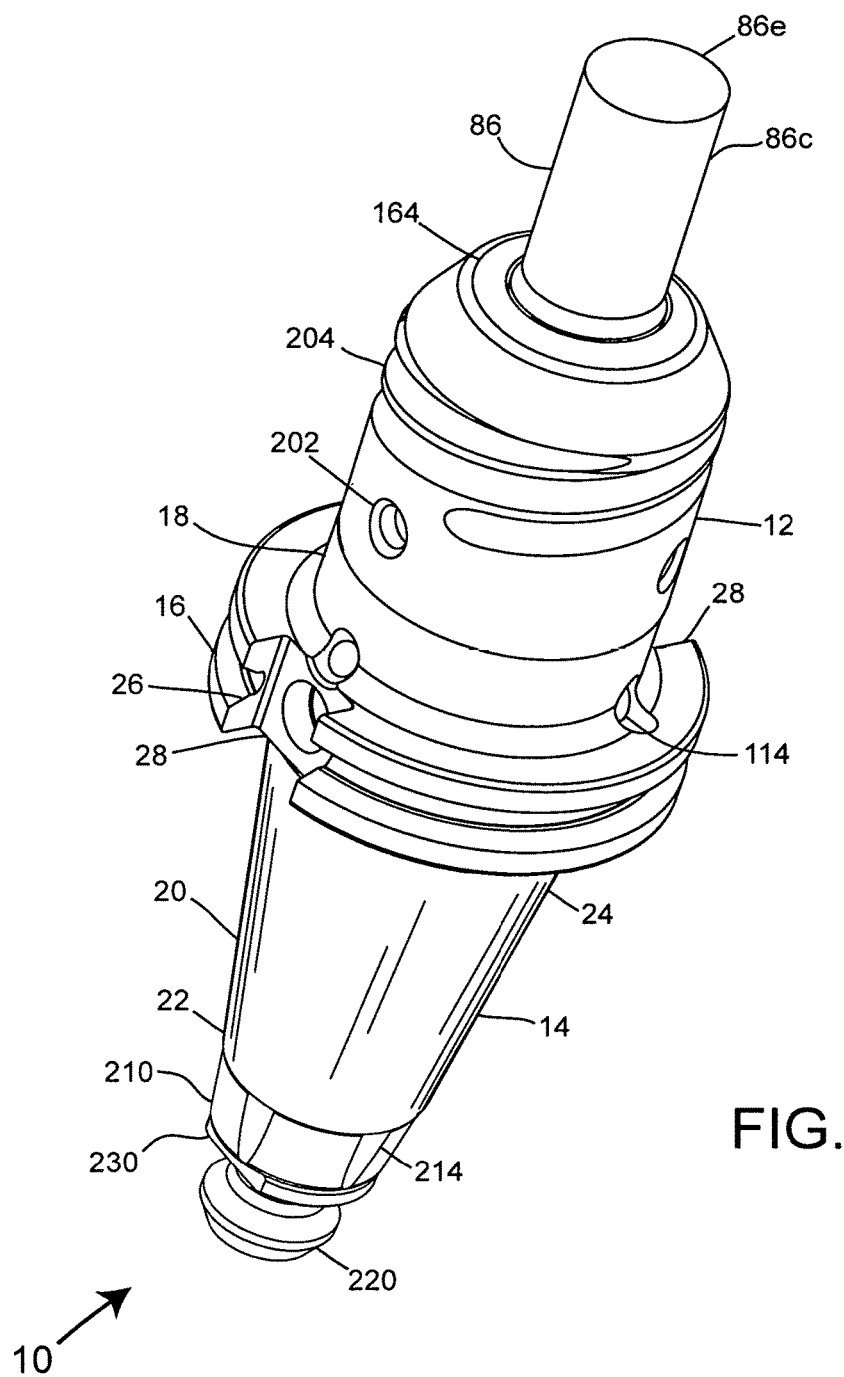
FIG. 1 is a side perspective view of the preferred embodiment of the present invention illustrating a holder body connected to a holder nose fitted with an end mill.
Figure 2:
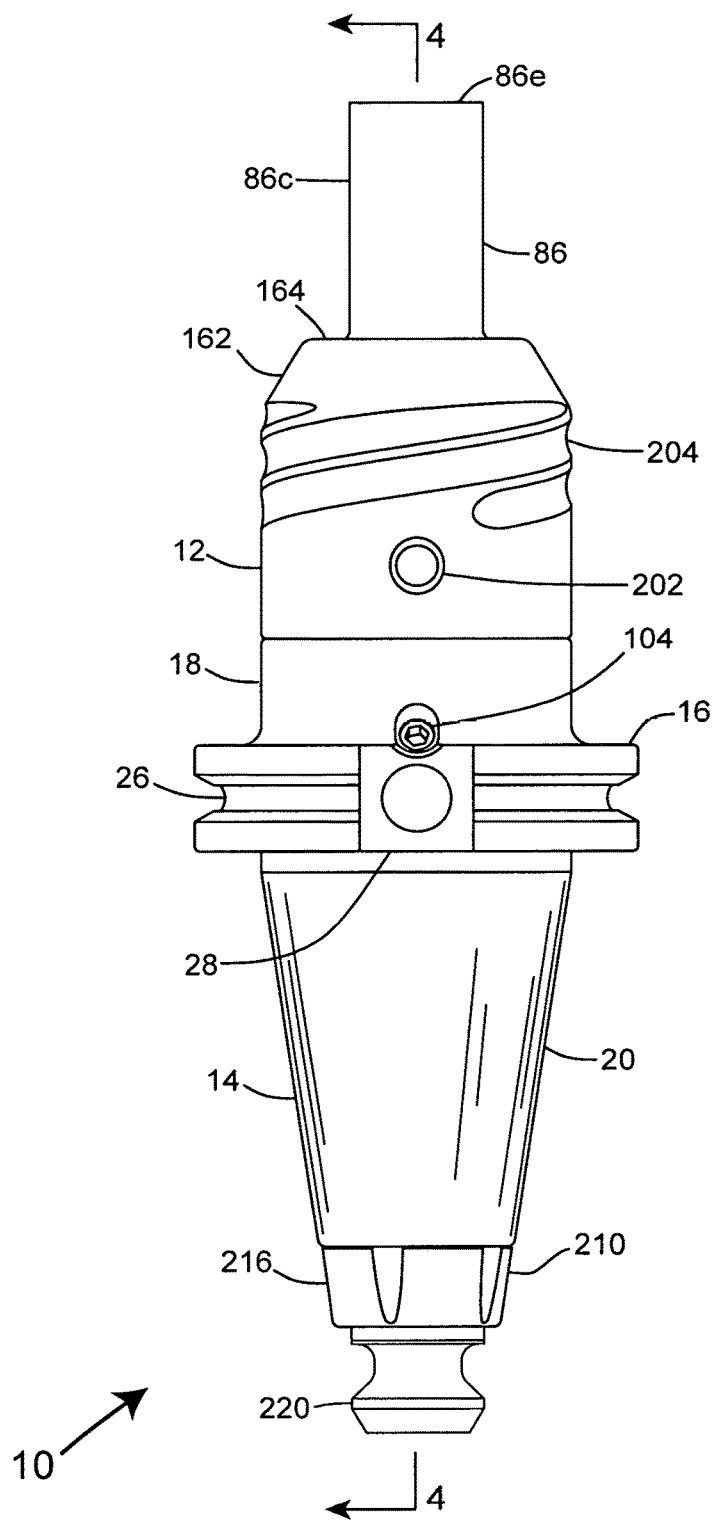
FIG. 2 is a side elevational view of the preferred embodiment of the present invention illustrating a holder nose connected to a holder body having a radially projecting v-flange circumferentially separating first and second divided sections.

Referring now to FIGS. 1 and 2, there is shown generally at 10 a tool holding apparatus comprising a holder nose 12 connected to a holder body 14 having a radially projecting v-flange 16 separating a first divided section 18 from a second divided section 20 configured with integral interfacing means for interfacing and adapting to a machine spindle receiver (not shown) operably associated with a computer numerical control milling machine or CNC milling machine.

Figure 3:
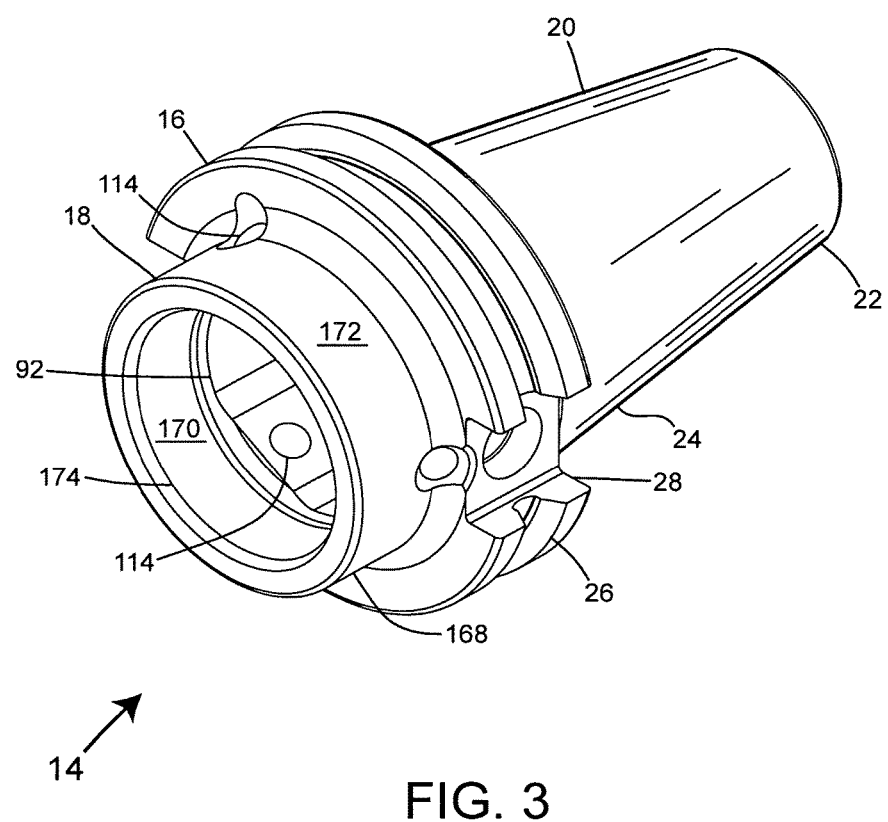
FIG. 3 is an end perspective view of the preferred embodiment of the present invention illustrating a holder body having integral interfacing means with a tapered configuration and a radially projecting v-flange.

In a preferred form of integral interfacing means, as primarily illustrated in FIG. 3, the holder body 14 incorporates within its configuration the traditional structural characteristics of a steep taper shank of the kind readily known and referred to in the art as CAT, BT, and SK type of shanks. The first and second divided sections 18, 20 of the steep taper shank are principally defined by their respective cylindrical and tapered exterior surfaces. The second divided section is preferentially shown in FIG. 1 as comprising a first end 22 having a diameter comparatively smaller than a diameter at a second end 24, such that the first end progressively enlarges in diameter to the second end where placement of the radially projecting v-flange 16 circumferentially divides the first and second divided sections. It is further understood within the context of recognizable industrial standards and specifications that the radially projecting v-flange 16 comprises structural features in the nature of a v-shaped circumferential groove 26 and one or more pairs of opposing recesses 28 that sufficiently allow an automatic tool changer, as generally associated with and operating alongside most CNC milling machines, to engage and lock onto the tool holding apparatus 10 for periodic placement and removal thereof from the machine spindle receiver as needed from time to time during milling operations, in addition to serving as means for properly orientating and preventing rotational slip of the tool holding apparatus 10 relatively to the machine spindle receiver during operation.

Because of the varying design possibilities associated with machine spindle receivers of the type typically known in the art and provided by manufacturers of CNC milling machines, often being dictated by industrial standards and specifications such as ASTM, DIN, ISO, and others, it is well recognized and understood within the context of this disclosure that integral interfacing means incorporated within the structure of the holder body 14 may comprise alternative geometries, configurations, designs, and arrangements other than what has been described above for the steep taper shank, particularly to coincide with the unique design characteristics of the machine spindle receiver insofar to fulfill the disclosed utilitarian objectives and principles of the present invention.

Referring now to FIGS. 4-8, the holder body 14 as incorporating integral interfacing means primarily comprises a centralized axial bore 42 having first, second, and third internal cylindrical sections 44, 46, 48 concentrically aligned with one another for receiving and housing therewithin an internal assembly comprising a tension bolt 50 a lock nut 52, and a thrust nut 54. The first internal cylindrical section 44 is generally shown in FIG. 6 as having a circumferential shoulder 56 formed by the diametric difference between first and second sub-cylindrical compartments 58, 60 particularly being configured to adaptively accommodate the diametric transition between a distal end 62 and an elongated member 64 collectively associated with the tension bolt.

Since the distal end 62 of the tension bolt, as generally shown in FIGS. 9-13, comprises a larger diameter than the elongated member, it can spatially accommodate placement and connection of an interface subassembly 66 sufficiently suited to further operably interact with the machine spindle receiver directed to the steep shank, while yielding an adequate amount of structural strength to and along the elongated member 64 during its operative capacity to inwardly draw the thrust nut 54 toward the lock nut 52.

Figure 4:
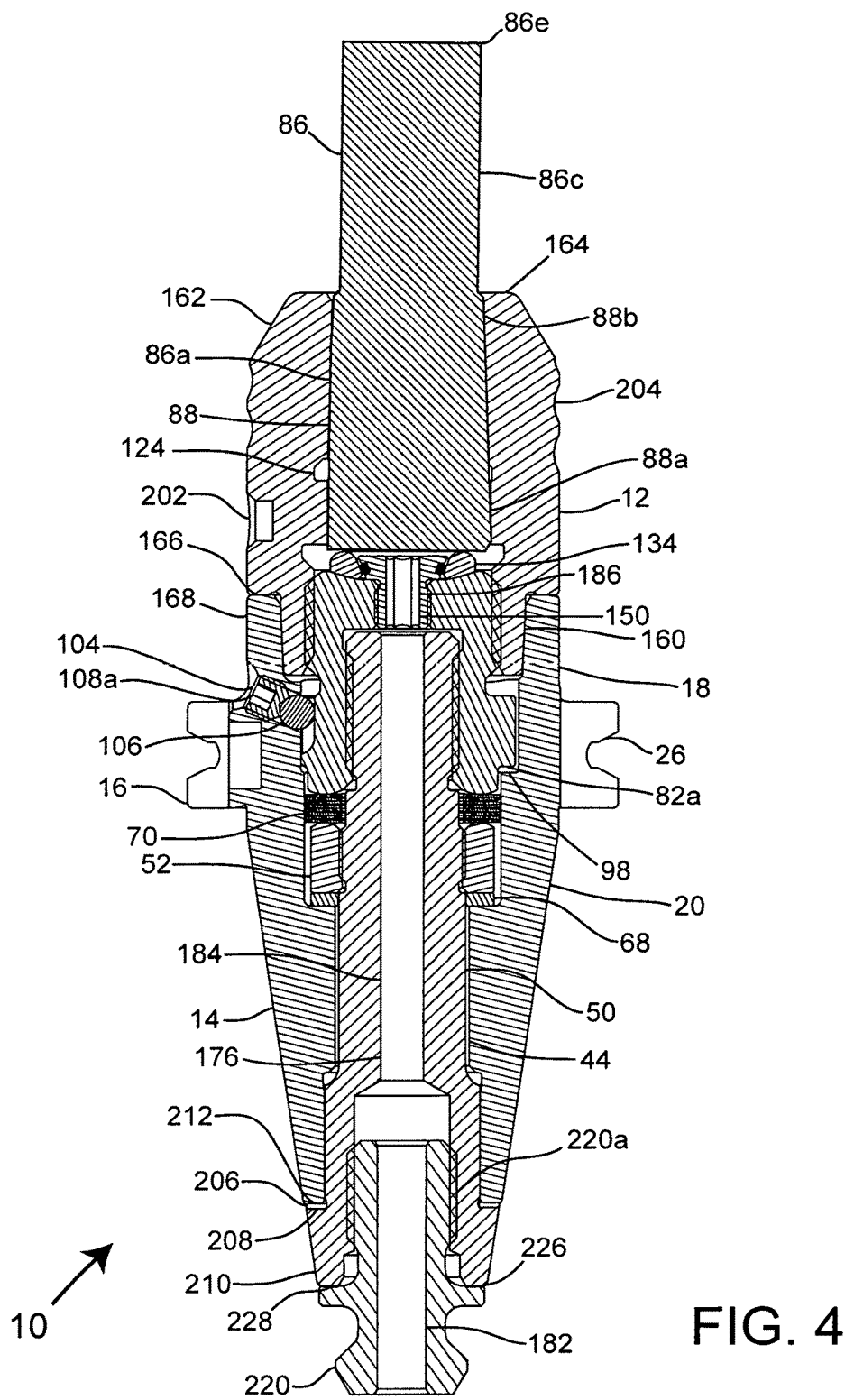
FIG. 4 is a cross sectional view of the preferred embodiment of the present invention taken along lines 4-4 in FIG. 2 illustrating a holder nose connected to a holder body having integral interfacing means and a centralized axial bore for housing therewithin a tension bolt, a lock nut, and a thrust nut connected to the holder nose fitted with an end mill.
Figure 7:
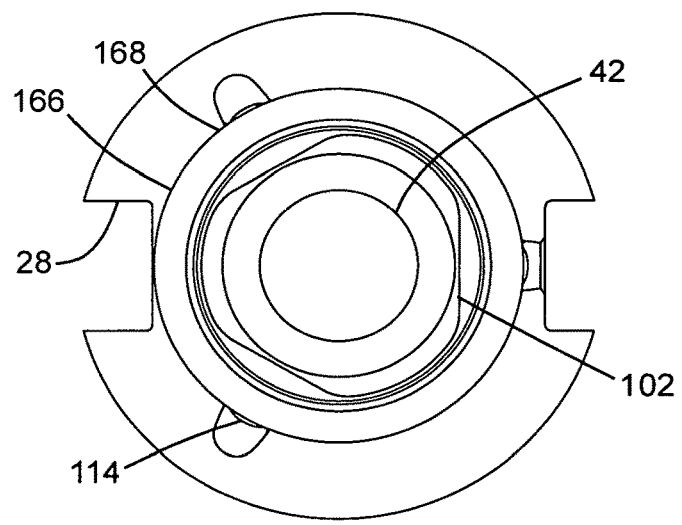
FIG. 7 is a top end view of the preferred embodiment of the present invention illustrating a holder body having integral interfacing means with a radially projecting v-flange configured with a pair of opposing recesses.
Figure 8:
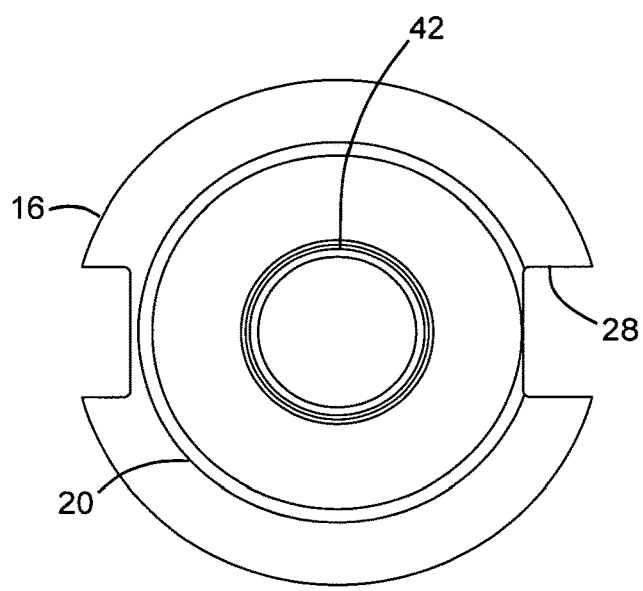
FIG. 8 is a bottom end view of the preferred embodiment of the present invention illustrating a holder body having integral interfacing means and a centralized axial bore concentrically aligned with a radially projecting v-flange.
Figure 9:
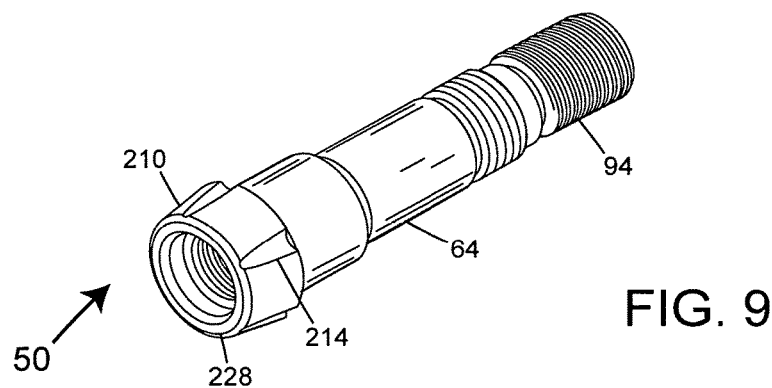
FIG. 9 is a side perspective view of the preferred embodiment of the present invention illustrating a tension bolt having a distal end integrally connected to an elongated member.
Figures 10, 11:
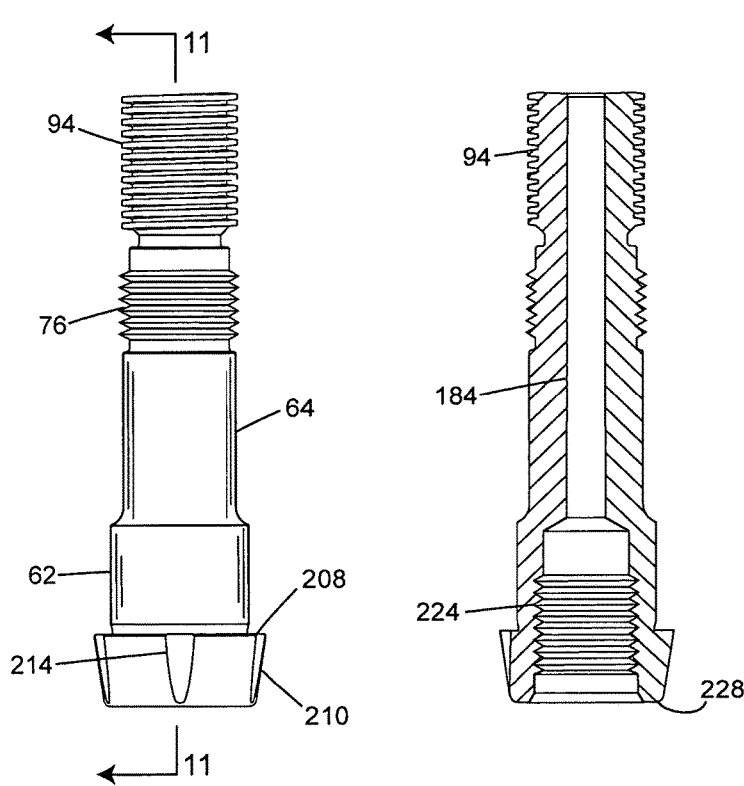
FIG. 10 is a side elevational view of the preferred embodiment of the present invention illustrating a tension bolt having an elongated member configured with a threaded end section and a threaded midsection.
FIG. 11 is a cross sectional view of the preferred embodiment of the present invention taken along lines 11-11 in FIG. 10 illustrating a tension bolt having a second throughput bore concentrically aligned with a threaded bore for threadably receiving a threaded end section of a retention knob.
Figure 12:
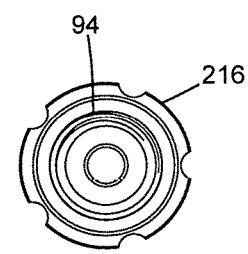
FIG. 12 is a top end view of the preferred embodiment of the present invention illustrating a tension bolt having a distal end affixed with a capped end.
Figure 13:
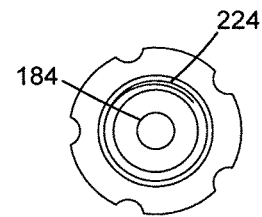
FIG. 13 is a bottom end view of the preferred embodiment of the present invention illustrating a tension bolt having a second throughput bore concentrically aligned to a threaded bore.
Figure 14:
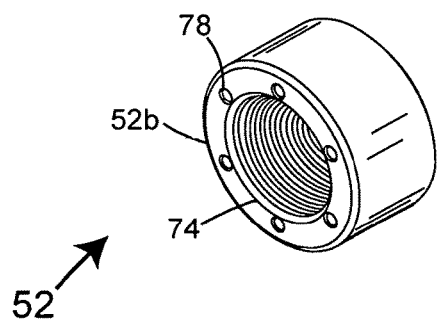
FIG. 14 is a side perspective view of the preferred embodiment of the present invention illustrating a lock nut with a plurality of bores positioned on a proximal side thereof.
Figure 15:
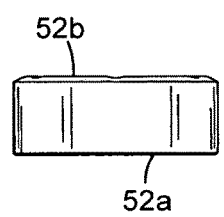
FIG. 15 is a side elevational view of the preferred embodiment of the present invention illustrating a lock nut.
Figure 16:
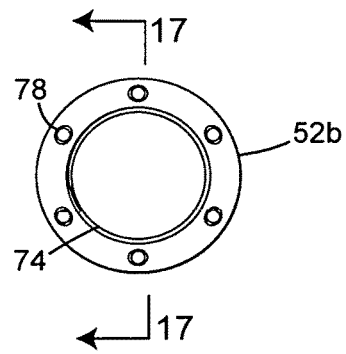
FIG. 16 is a top end view of the preferred embodiment of the present invention illustrating a lock nut having a threaded cylindrical bore extending therethrough and a plurality of bores positioned on a proximal side thereof.
Figure 17:
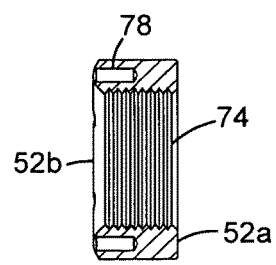
FIG. 17 is a cross sectional view of the preferred embodiment of the present invention taken along lines 17-17 in FIG. 16 illustrating a lock nut having a threaded cylindrical bore extending therethrough.

The second internal cylindrical section 46, which is generally shown in FIG. 4 as being situated between the first and third internal cylindrical sections, accommodates placement of and houses the lock nut 52, a thrust slip washer 68, and a plurality of spring washers 70. An interior radial shoulder 72 formed by the diametric difference between the second internal cylindrical section and second sub-cylindrical compartment serves to receive and retain placement of the thrust slip washer 68 while in an abutting relation with a distal side 52a of the lock nut 52. In this regard, the thrust slip washer operably serves to distribute compressive loads, eliminate an adverse condition of material galling between structural metallic surfaces, and mitigate occurrences of premature wear that may be realized without its placement. For example, an unwanted instance of premature wear may be realized about the interior radial shoulder 72 where the lock nut 52 experiences periodic rotation within the second internal cylindrical section as the tension bolt 50 is being tightly turned clockwise to inwardly draw the thrust nut 54 against a proximal side 52b of the lock nut 52.

The lock nut in FIGS. 14-17 is further featured with a threaded cylindrical bore 74 to threadably engage with a threaded midsection 76 of the elongated member 64 of the tension bolt and a plurality of bores 78 perpendicularly placed into and equally spaced apart about the proximal side that assist in tightening the lock nut relatively to the tension bolt with a hand-held tool configured with two or more opposing prongs (not shown) for fitment within the bores. The spring washers 70 are preferentially shown in FIG. 4 as being placed in between the proximal side of the lock nut and an annular rim 80 associated with the thrust nut and arranged in a stacked configuration to assume a predetermined amount of compressive loading realized by tightening the tension bolt. Through this arrangement, the spring washers effectively establishes a predetermined amount of preload that furthers the requisite amount of tightening tolerance between the lock nut and thrust nut as the tension bolt is tightened to draw the thrust nut 54 toward the lock nut 52, primarily along the longitudinal axis of the holder body. Since the lock nut and associated components in direct or indirect contact thereof may comprise surface irregularities or imperfections during their manufacture, which can result in less than perfect surface contact among components during assembly, the proximal side 52b as well as the annular rim 80 comprise a rounded geometric profile of the type respectively depicted in FIGS. 15-17 and 19-20 to operate conjunctively with the spring washers to establish a predetermined amount of tangential surface contact. Accordingly, under the condition of compressive loading, the stacked spring washers will deform sufficiently to the extent of assuming the surface irregularities and the rounded geometry of the proximal side 52b and annular rim 80 for enhanced surface contact that adequately offers alignment of components and an appreciable amount of structural rigidity to the tool holding apparatus 10 after assembly.

Figure 18:
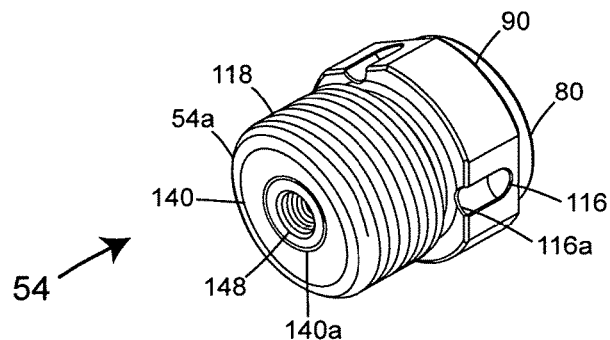
FIG. 18 is a side perspective view of the preferred embodiment of the present invention illustrating a thrust nut having first and second outward cylindrical surfaces concentrically aligned with one another.
Figure 19:
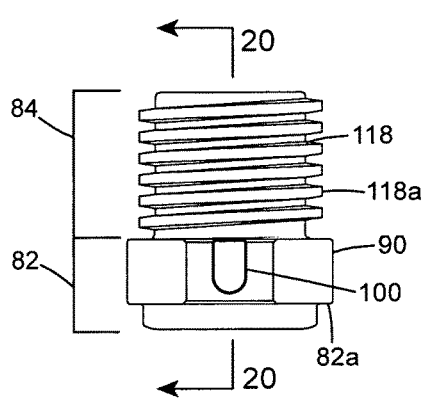
FIG. 19 is a side elevational view of the preferred embodiment of the present invention illustrating a thrust nut comprising a first outward cylindrical surface having flat segments each being configured with a groove and a second outward cylindrical surface having external threads.
Figure 20:
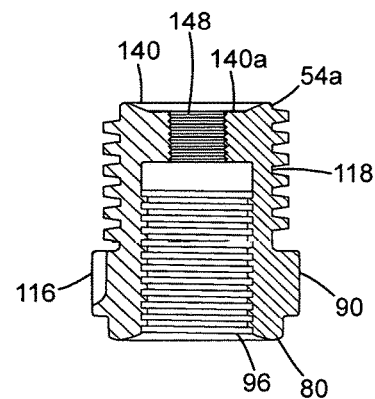
FIG. 20 is a cross sectional view of the preferred embodiment of the present invention taken along lines 20-20 in FIG. 19 illustrating a thrust nut having an inner threaded bore concentrically aligned to first and second outward cylindrical surfaces.

Referring now to FIGS. 18-22, the thrust nut 54 is distinctly featured with first and second structural sections 82, 84 that operably interact with the tension bolt 50 and the holder nose 12 to draw inwardly the position of the holder nose toward the holder body and assist in retaining the position of a tool in the form of an end mill 86 within an axial bore 88 generally present and associated with the holder nose 12. The first structural section 82 is shown in FIGS. 18-20 as comprising a first outward cylindrical surface 90 generally configured to concentrically align with and reside within the confines of a first chamber 92 of the third internal cylindrical section and partially within the second internal cylindrical section and is secured therewithin by locking means. Locking means in its operative capacity serves to prevent rotational motion of the thrust nut 54 relatively about its longitudinal axis, primarily in the instance where a threaded end section 94 of the elongated member 64 of the tension bolt 50 threadably engages an inner threaded bore 96 of the thrust nut to draw inwardly its position toward the lock nut 52 while presetting the requisite amount of clearance between a radial face 82a of the first structural section 82 and a radial stop 98 formed by the diametric difference between the first chamber 92 and second internal cylindrical section 46 of the holder body 14.

Figure 21:
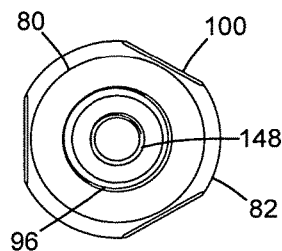
FIG. 21 is a bottom end view of the preferred embodiment of the present invention illustrating a thrust nut having a first outward cylindrical surface configured with three flat segments and concentrically aligned to a threaded bore and an inner threaded bore.
Figure 22:
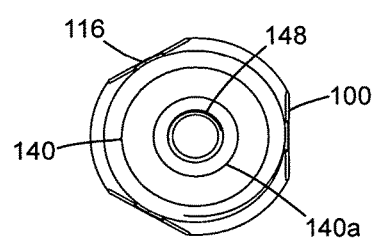
FIG. 22 is a top end view of the preferred embodiment of the present invention illustrating a thrust nut having a radial depression and a threaded bore concentrically aligned to a second outward cylindrical surface for threadably mounting a leveling assembly.
Figure 23:
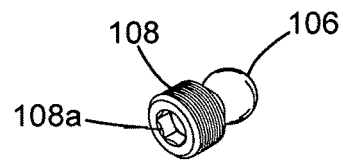
FIG. 23 is a side perspective view of the preferred embodiment of the present invention illustrating a retention screw having a threaded cylindrical body integrally connecting to a tapered end and a conical depression for engaging a spherical portion of a ball.
Figure 24:
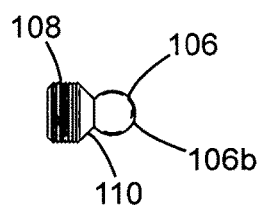
FIG. 24 is a side elevational view of the preferred embodiment of the present invention illustrating a retention screw having a threaded cylindrical body concentrically aligned to a tapered end and a conical depression for engaging a spherical portion of a ball.
Figure 25:
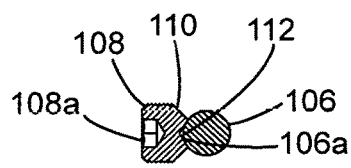
FIG. 25 is a cross sectional view of the preferred embodiment of the present invention taken along lines 25-25 in FIG. 26 illustrating a retention screw having a conical depression for engaging a spherical portion of a ball.
Figure 26:
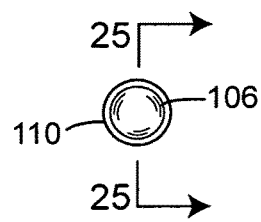
FIG. 26 is a right end view of the preferred embodiment of the present invention illustrating a retention screw having a tapered end configured with a ball in concentric alignment therewith.
Figure 27:
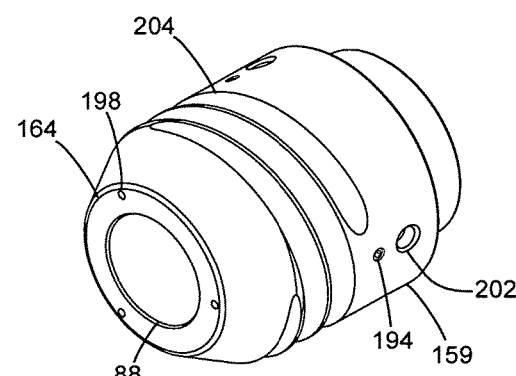
FIG. 27 is a side perspective view of the preferred embodiment of the present invention illustrating a holder nose having an outer wall structure configured with a plurality of pilot bores and a spiral groove and a frontal end configured with three outlets.

Locking means in this direct application, as generally depicted in FIGS. 21 and 22, may comprise one or more flat segments 100 integrated within the general cylindrical structure of the first outward cylindrical surface to establish a resultant geometric profile corresponding to an equally configured first chamber 102. In this regard, the preferred embodiment furthers utilization of three flat segments 100 spaced equally apart about the periphery of the first outward cylindrical surface 90 to correspond to the first chamber 92 having an equivalent receiving configuration, as generally illustrated in FIG. 4. Accordingly, it is understood within the context of this disclosure that other geometric configurations and profiles may be applicably suited for locking means, including a plurality of splines, teeth, grooves, or channels generally being positioned about the periphery of the first outward cylindrical surface 90 and orientated to extend lengthwise relatively about the longitudinal axis of the thrust nut, such as to result in an overall geometric profile sufficiently suited to fit within the equally configured first chamber 102.

To further a secure relationship between the thrust nut 54 and holder body 14, locking means may incorporate usage of one or more securing subassemblies each comprising a retention screw 104 and a ball 106 situated in vicinity of the radially projecting v-flange 16 and first chamber 92 of the third cylindrical section. The retention screw is preferably shown in FIGS. 23-26 as comprising a threaded cylindrical body 108 concentrically adjoined to a tapered end 110 with a conical depression 112 for engaging a spherical portion 106a of the ball to retain its position in axial alignment with the threaded cylindrical body. The threaded cylindrical body is further illustrated as being equipped with a hexagonal socket 108a that suffices as assistive means for installing the retention screw with a hand hex tool (not shown) or an equivalent form of manual tool during initial assembly or service.

In its attached state, the threaded cylindrical body 108 of the retention screw is generally shown in FIG. 4 as being threadably positioned into a corresponding threaded hole 114 preferentially present near the juncture of the first and second chambers of the third internal cylindrical section 48, adjacent to the radially projecting v-flange, and diagonally extending through the holder body's wall section, particularly being arranged to allow an opposing spherical portion 108b of the ball to be radially pushed inward into a groove 116 integrated within the structure of each of the three flat segments 100. The groove is preferably arranged in FIG. 19 to extend lengthwise relatively to the longitudinal axis of the thrust nut 54 so as to further the opportunity to move its position axially within the first chamber 102 of the third internal cylindrical section yet eliminate the possibility of rotational motion thereof during rotational movement or turning of the tension bolt 50 while drawing inwardly or pushing outwardly the thrust nut and in instances of threadably fastening and unfastening the holder nose 12 respectively to and from the holder body 14.

Furthermore, since the groove 116 is configured with an open end 116a most near the transitional juncture between the first and second structural sections 82, 84, axial movement of the thrust nut 54 is strictly limited insofar to prevent complete removal of the thrust nut from the holder body 14, notably in the instance of an inadvertent or accidental effort to overturn the tension bolt 50 beyond acceptable limits to facilitate detachment of the holder nose 12 from the external threads of the second outward cylindrical surface. This ensures that the tool holding apparatus 10 can be disassembled to a relative degree without unduly compromising the entire assembly thereof, particularly when it becomes solely desirable to change out the end mill 86 from the holder nose from time to time during milling operations. Accordingly, in this regard, the groove 116, as shown in FIGS. 18 and 19, comprises a width substantially corresponding to the diameter of the ball 106 and a predetermined length to effect free rotational movement of the ball while being engaged with the groove yet allow for limited axial movement of the thrust nut 54 relatively within the first chamber 102.

Referring now to FIGS. 18 and 19, the thrust nut 54, as featured with the second structural section 84 in axial alignment with and integrally connected to the first structural section 82, supplementally comprises a second outward cylindrical surface 118 incorporating external threads 118a for threadably engaging an internal threaded bore 120 of the holder nose 12, sufficiently serving in part as means for inhibiting axial movement of the end mill 86 within the axial bore 88 of the holder nose. In the preferred embodiment of the tool holding apparatus 10, the external threads and internal threaded bore are configured with trapezoidal threads insofar to sufficiently withstand the applied tensional forces and offer a strengthened union while the holder nose is conditionally tightened to the thrust nut 54.

As exemplified in FIGS. 27-31, the internal threaded bore 120 is concentrically aligned with the axial bore 88 and forms in part the structure of an inner cylindrical flange 122 of the holder nose. The axial bore is preferably shown in FIG. 29 as comprising one or more circumferential grind reliefs 124 situated therewithin and a reverse-tapered configuration formed by the progressive change in diameter between rearward and forward ends 88a, 88b thereof, wherein the diameter of the rearward end is comparatively larger than that of the forward end to establish an effective overall angular slope or reverse taper A' of approximately 2.5 degrees from axis L' extending longitudinally about the holder nose 12. In fulfilling the functionality of axial inhibiting means, primarily to inhibit axial movement of the end mill 86 within the confines of the axial bore, a shaft portion 86a of the end mill shown in FIGS. 32-35 is configured with a tapered profile 86b equally formed by the progressive change in diameter between first and second ends 86f, 86g of the shaft portion such to establish an angular offset A" with axis L" extending longitudinally about the end mill that substantially corresponds to reverse taper A' of the axial bore 88, with spatial allowances being made to accommodate a tight fit within acceptable tolerances.

Figure 32:
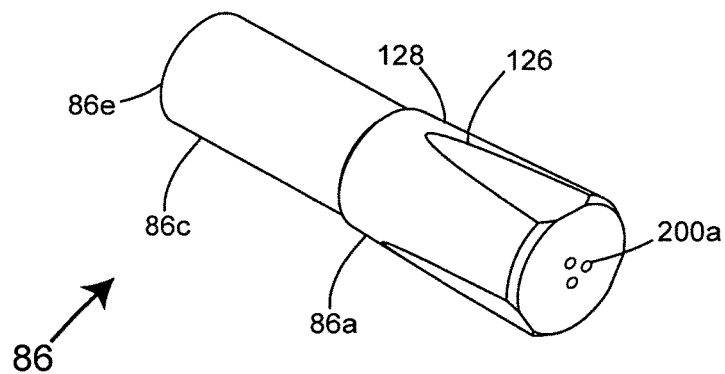
FIG. 32 is a side perspective view of the preferred embodiment of the present invention illustrating an end mill having a shaft portion integrally connecting to a cutter end section.
Figure 33:
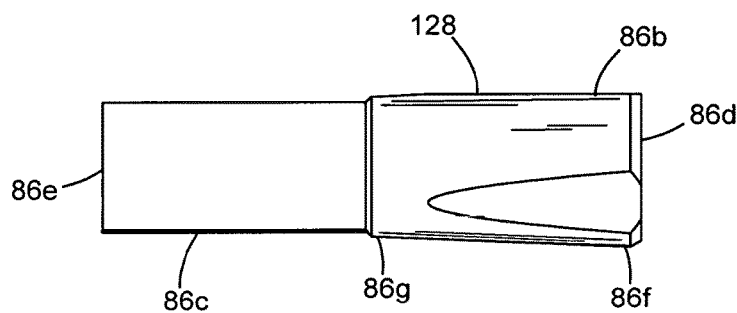
FIG. 33 a side elevational view of the preferred embodiment of the present invention illustrating an end mill having a shaft portion concentrically aligned and integrally connecting to a cutter end section.
Figure 34:
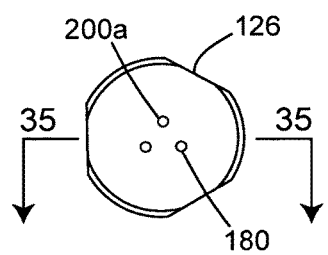
FIG. 34 a right end view of the preferred embodiment of the present invention illustrating an end mill having a shaft portion configured with three flat trigonal flat sectors and a second passageway with three inlets.

Supplementary to axial inhibiting means, the tool holding apparatus 10 incorporates use of rotational inhibiting means for preventing occurrences of inadvertent rotational slip of the end mill within the structural confines of the axial bore 88 as a cutter end section 86c of the end mill 86 notably experiences rotational resistance while selectively engaging a work piece during milling operations, for instance. As depicted in FIGS. 32-34, rotational inhibiting means preferably comprises three flat trigonal sectors 126 each being equally spaced apart from one another about an outer peripheral surface 128 of the tapered profile of the shaft portion of the end mill such as to result in an overall trigonal tapered configuration suited to fit within equally configured axial bore adaptively having three flat sectors 130 integrated therewithin. Hence, the combination of axial inhibiting means and rotational inhibiting means has the desirable effect to respectively prevent pullout and rotational slip of the end mill during aggressive and rigorous milling operations. With due consideration above, it is appreciably understood within the context of this disclosure that rotational inhibiting means, like locking means described above, may incorporate alternative geometries in the nature of splines, teeth, channels, or grooves integrated within the structure of the axial bore 88, sufficiently of which to form an overall configuration substantially corresponding to a shaft portion 86a having an equivalent geometric profile that furthers the desirable effect of inhibiting rotational movement of the end mill within the axial bore of the holder nose.

Referring now to FIG. 4, the thrust nut 54 is supplementally featured with a leveling assembly 132 that effectively addresses the possible presence of undesirable surface imperfections in the end mill and neighboring components in contact thereof, such of which can further less than optimum surface contact of the shaft portion while positioned within the confines of the axial bore 88, possibly to the extent of establishing a condition of misalignment, eccentric positioning and insufficient hold of the end mill within the axial bore that may perhaps further inaccurate milling of the work piece.

In fulfilling this utilitarian objective, the leveling assembly 132, as shown in FIGS. 36-42, comprises a spherical washer 134 having a top annular side 136 with a pronounced rounded profile 136a and a bottom spherical side 138 with a downward radial bevel 138a for fitment within an equally configured radial depression 140 present at the end portion 54a of the thrust nut 54. Securement of the spherical washer within the radial depression is made possible by a retaining screw 142, which is shown in FIGS. 36-40 as having a flat head 144 and a threaded sectional end 146 integrally connected thereto for passing through an orifice 134a of the spherical washer and threadably engaging a threaded bore 148 present in the thrust nut, generally configured in axial alignment with the internal threaded bore 120. A longitudinal hexagonal bore 150 extending through the flat head and threaded sectional end serves as assistive means for tightening and loosening the retaining screw from time to time with a manual hex wrench (not shown) or equivalent form of tool. Since the leveling assembly is configured to assume moderate surface imperfections possibly present in the shaft's tip 86d, the flat head 144 is configured with an o-ring 152 that permits the spherical washer to float to a certain degree and undergo a level of deformational movement to the extent of conformably contacting the shaft tip 86d and properly seating the end mill 86 within the axial bore 88. A groove 154 placed about the outer periphery of the flat head serves to fixedly accept and seat the o-ring.

In its sub-assembled state, where the retaining screw is fitted with the o-ring and collectively configured within the annular confines of the spherical washer, the leveling assembly 132 is suited for threaded attachment to the thrust nut by means of the retaining screw 142 and tightened thereabout to a predetermined torque setting, sufficiently allowing an inside shoulder 142a thereof to engage a bottom-most portion 140a of the radial depression 140, as typically illustrated in FIG. 4. Accordingly, the leveling assembly can now effectively assume the surface imperfections possibly present in the shaft tip 86d of the end mill insofar to fulfill a sufficient amount surface contact that properly seats and concentrically aligns the end mill within the axial bore for accurate and precise milling of the work piece.

The holder nose 12 is further featured with an annular ridge 156 formed by the diametric difference between an outer surface 158 of the holder nose and an outer tapered wall 160 of the inner cylindrical flange 122 and a circumferential bevel 162 at a frontal end 164 of the holder nose that mainly serves to streamline the outward appearance of the holder nose and offer a level of working clearance of the tool holding apparatus 10 during milling operations. The annular ridge 156 is preferentially shown in FIG. 4 as being in an abutting relation with an annular edge 166 of an annular wall structure 168 formed by the diametric difference between interior and exterior walls 170, 172 of a second chamber 174 of the third internal cylindrical section 48 and serves as means for limiting the extent the holder nose 12 travels relatively inward toward the holder body 14 while the inner cylindrical flange 122 is slidably positioned within the structural confines of the second chamber 174 of the third internal cylindrical section 48. At this instance, a relative amount hoop stress or a minute amount of elastic deformation occurs relatively about and between the annular wall structure and interior wall 170 of the second chamber, since the outer tapered wall 160 generally comprises a greater angular pitch in relation to that of a tapered configuration of the interior wall. Accordingly, the relative angular difference between the outer tapered wall and tapered interior wall sufficiently yields a concentric relationship and strengthens the union between the holder nose 12 and holder body 14.

As generally depicted in FIGS. 29-30 and 34-35, the tool holding apparatus 10 further incorporates within its overall structure cooling and lubricating means for cooling and lubricating the cutter end section 86c of the end mill 86 and work piece during rigorous and aggressive milling operations. Cooling and lubricating means preferably comprises a centralized axial passageway 176 in hydraulic communication with a first passageway 178 positioned within the structure of the holder nose 12 and/or a second passageway 180 positioned within the structure of the end mill to efficiently carry and transport a liquid coolant or lubricant throughout the tool holding apparatus 10 to the cutter end section 86c of the end mill and work piece, particularly in a manner of furthering a controlled thermal environment that is conducive in preventing weldment of the swarf or chips and prolonging the life of the cutter end section for sustained milling of the work piece.

Figure 29:
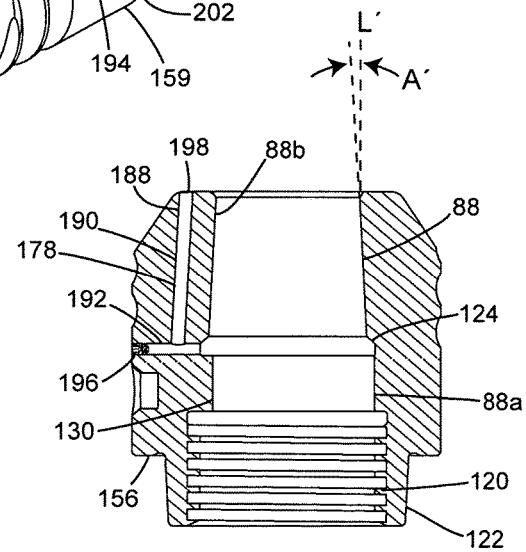
FIG. 29 is a cross sectional view of the preferred embodiment of the present invention taken along lines 29-29 in FIG. 28 illustrating a holder nose having an internal threaded bore concentrically aligned to an axial bore.
Figure 30:
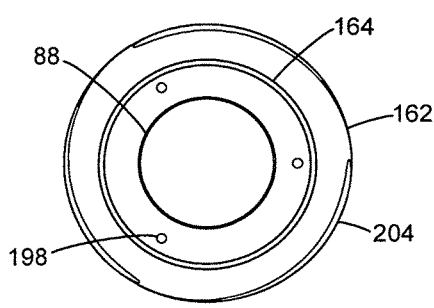
FIG. 30 is a top end view of the preferred embodiment of the present invention illustrating a holder nose having a circumferential bevel and a frontal end configured with three outlets of a first passageway.
Figure 31:
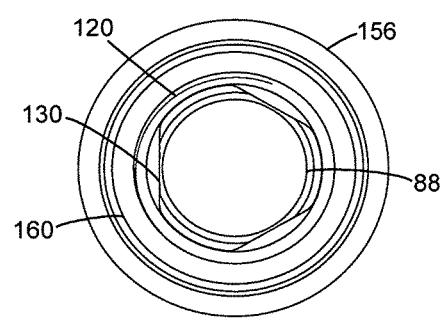
FIG. 31 is a bottom end view of the preferred embodiment of the present invention illustrating a holder nose comprising an axial bore configured with three flat sectors integrated within its tapered configuration.

As generally exemplified in FIG. 4, the centralized axial passageway comprises first, second and third throughput bores 182, 184, 186 respectively present in and extending in axial alignment through the interface subassembly 66, tension bolt 50, and thrust nut 54 and leveling assembly and terminates generally in vicinity of the end portion 54a of the thrust nut, at which point the coolant enters into the first or second passageway respectively disposed within the holder nose 12 or end mill 86. In FIGS. 29 and 30, the first passageway is shown to comprise at least three sets of interconnected conduits 188 equidistantly arranged from one another and interiorly positioned within an outer wall structure 159 of the holder nose to yield a balanced condition of the tool holding apparatus 10. Each set of interconnected conduits is shown in FIG. 29 as comprising first and second ducts 190, 192 in hydraulic communication with one another and centralized axial passageway, where the flow into and through the first duct 190 can be controlled by means of a set screw 194 threadably positioned within a threaded bore 196 extending into the second duct 192. The extent by which the set screw is turned inward or outward controls the amount of coolant and lubricant delivered to the end mill 86 or work piece via the first duct and into an outlet 198 extending through the frontal end 164 of the holder nose.

Figure 35:
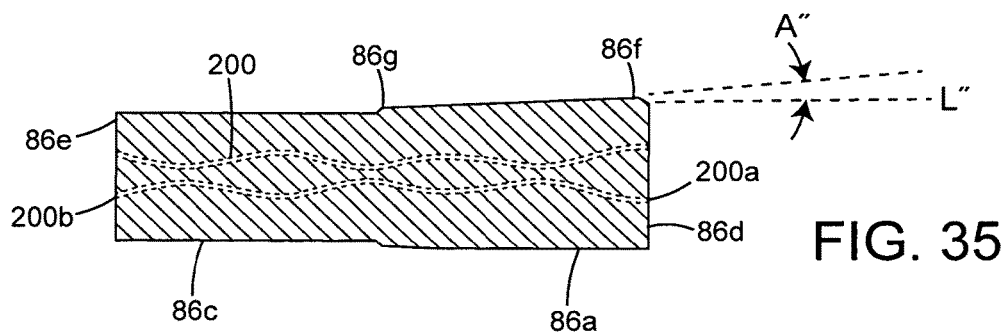
FIG. 35 is a cross sectional view of the preferred embodiment of the present invention taken along lines 35-35 in FIG. 34 illustrating an end mill having a second passageway configured with three convoluted passages and a shaft portion integrally connecting to a cutter end section.
Figure 36:
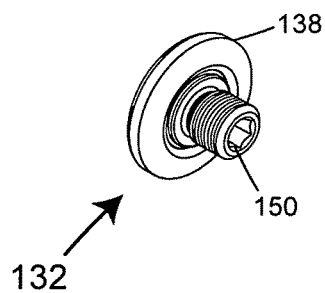
FIG. 36 is a bottom perspective view of the preferred embodiment of the present invention illustrating a leveling assembly.
Figure 37:
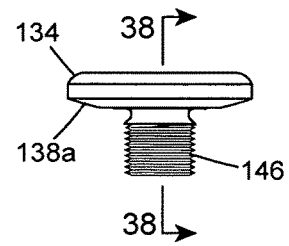
FIG. 37 is a front elevational view of the preferred embodiment of the present invention illustrating a leveling assembly having a retaining screw fitted with a spherical washer.
Figure 38:
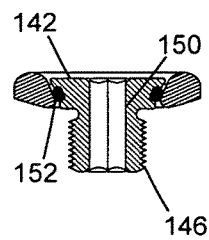
FIG. 38 is a cross sectional view of the preferred embodiment of the present invention taken along lines 38-38 in FIG. 37 illustrating an o-ring placed in between a retaining screw and a spherical washer.
Figure 39:
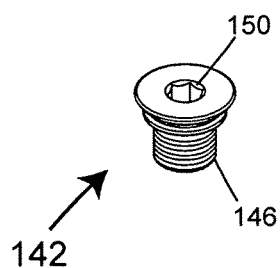
FIG. 39 is a top perspective view of the preferred embodiment of the present invention illustrating a retaining screw having a longitudinal hexagonal bore.
Figure 40:
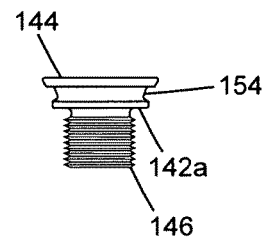
FIG. 40 is a front elevational view of the preferred embodiment of the present invention illustrating a retaining screw having a groove for receiving an o-ring.
Figure 41:
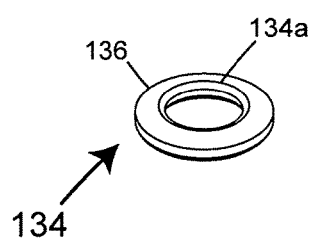
FIG. 41 is a top perspective view of the preferred embodiment of the present invention illustrating a spherical washer.
Figure 42:
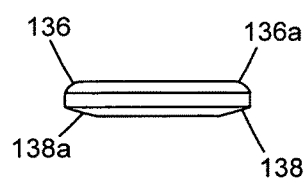
FIG. 42 is a front elevational view of the preferred embodiment of the present invention illustrating a spherical washer having a top annular side and a bottom spherical side with a downward radial bevel.

Comparatively, in FIGS. 32 and 34-35, the second passageway 180 is shown to comprise at least three convoluted passages 200 preferentially extending the length of the end mill and equidistantly arranged from one another to further a balanced condition relatively along the end mill 86. Each convoluted passage is further shown to comprise an inlet 200a and an outlet 200b respectively disposed within the shaft tip 86d and cutter tip 86e, where each inlet hydraulically communicates with the centralized axial passageway 176 to deliver coolant and lubricant to the cutter end section and work piece via the outlet 200b. An external coolant supply may supply the requisite amount of coolant and lubricant to cooling and lubricating means during milling operations via a draw bar (not shown) commonly associated with the clamping mechanism of the machine spindle receiver and connected to the interface subassembly 66 primarily associated with integral interfacing means of the holder body 14.

Figure 28:
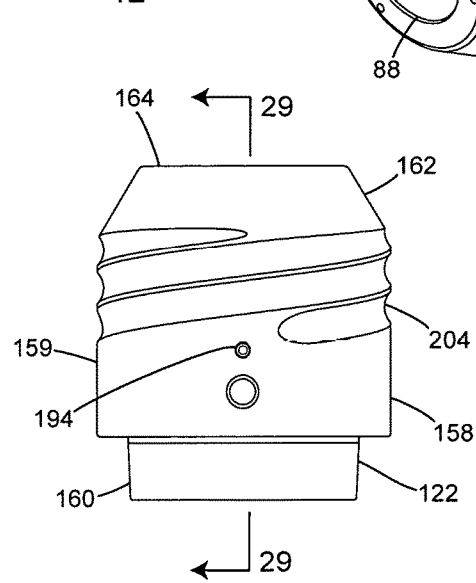
FIG. 28 is a side elevational view of the preferred embodiment of the present invention illustrating a holder nose having a circumferential bevel and an outer surface configured with a spiral groove and a set screw threadably engaged within a second duct.

Further, as shown in FIGS. 1 and 28, the tool holding apparatus 10 may comprise assistive separating means in the form of pilot bores 202 or channels substantially extending radially inward a predetermined amount from the outer surface 158 of the holder nose to mechanically assist in loosening and tightening the holder nose 12 relatively from and to the holder body 14. Preferably, the pilot bores or channels are spaced equally apart from one another about the outer surface to further a balanced condition of the tool holding apparatus 10, typically in the manner shown in FIG. 1. Tool pre-setting devices (collectively not shown), particularly in the form of a spanner wrench equipped with a prong for fitment within one of the pilot bores or channels, a nose positioning fixture equipped with alignment tabs for fitment within the pilot bores or channels, or a release cam ring equipped with cam pegs for fitment within the pilot bores or channels, may collectively or independently assist to loosen and tighten the holder nose 12 relatively to the holder body after disengagement of the drawbar associated with the clamping mechanism of the machine spindle receiver, such in the event of change out of the end mill or other operating components as may be needed from time to time during milling operations. In addition to assistive separating means for separating apart the holder nose 12 relatively from the holder body 14, the tool holding apparatus 10 may incorporate within the outer wall structure 159 of the holder nose a spiral groove 204 of the type shown in FIGS. 1 and 27 to operate conjunctively with an external extraction tool (not shown) to separate the end mill 86 from the holder nose, particularly being needed after application of compressive forces onto the end mill by means of the thrust nut that has forcefully wedged and locked into place the shaft portion 86*a* of the end mill within the geometric confines of the axial bore 88.

Now by way of briefly describing the assembly of the tool holding apparatus 10, one may appreciably gain further insight into the relatedness and interaction of the operative components discussed thus far that principally fulfill the utilitarian objects of the invention. The tool holding apparatus is initially assembled as two separable components, namely the holder nose 12 and holder body 14, and connected together as main components to achieve a final assembly for conforming fitment within the machine spindle receiver.

The holder nose, as the first main component generally operating alongside one or more tool pre-setting devices described above, is initially assembled by means of placement of the end mill 86 within the axial bore 88. Since the shaft portion of the end mill comprises a tapered profile 86*b* sufficiently incapable of being slidably inserted through the forward end 88*b* of the axial bore, the end mill must initially pass into and through the internal threaded bore 120 to yield a final locking arrangement thereof. The end mill is further positioned within the axial bore until the cutter end section 86*c* of the end mill noticeably extends beyond the frontal end 164 of the holder nose, making sure that the trigonal tapered configuration of the shaft portion 86*a* corresponds with and slidably engages the three flat sectors 130 integrated within the structure of the axial bore, typically as shown in FIG. 4. Threadably mounting the thrust nut 54 to the internal threaded bore and continuously turning thereof to a specified torque setting serves to push forward the end mill, sufficiently to the extent of realizing a tight fit between the shaft portion and axial bore. However, to ensure proper seating and axial alignment of the end mill within the axial bore, the thrust nut 54 is first threadably fitted with the leveling assembly 132, wherein the elasticity of the fitted o-ring 152 effectively allows the spherical washer 134 to float or slidably move to a relative degree within the radial depression 140 and assume the surface imperfections that may be possibly present in the shaft tip 86*d* of the end mill 86.

Figure 43:
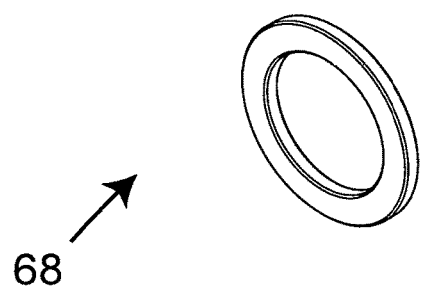
FIG. 43 is a side perspective view of the preferred embodiment of the present invention illustrating a thrust slip washer.
Figure 44:
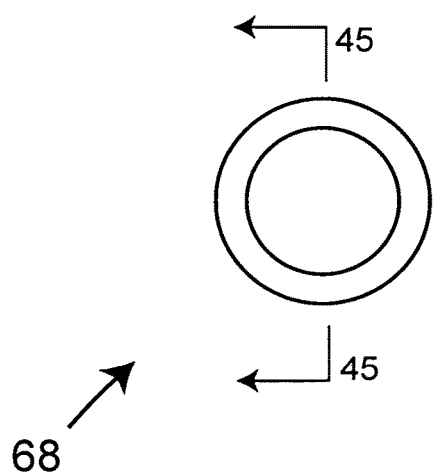
FIG. 44 a side elevational view of the preferred embodiment of the present invention illustrating a thrust slip washer.
Figure 45:
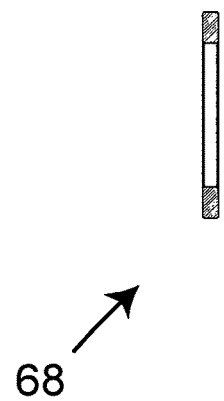
FIG. 45 is a cross sectional view of the preferred embodiment of the present invention taken along lines 45-45 in FIG. 44 illustrating a thrust slip washer.
Figure 46:
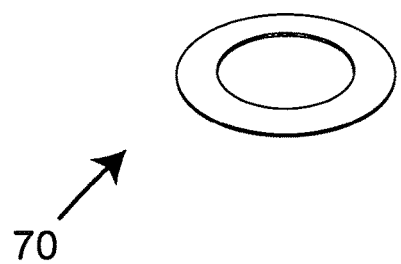
FIG. 46 is a top perspective view of the preferred embodiment of the present invention illustrating a spring washer.
Figure 47:
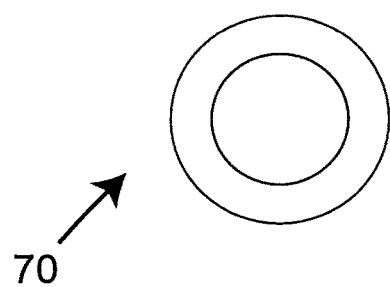
FIG. 47 a top plan view of the preferred embodiment of the present invention illustrating a spring washer.
Figure 48:
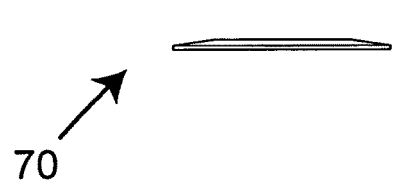
FIG. 48 is a front elevational view of the preferred embodiment of the present invention illustrating a spring washer.

The holder body, as a second main component, is initially assembled by placing and seating the thrust slip washer 68 of the type shown in FIGS. 43-45 relatively onto the interior radial shoulder 72. The threaded cylindrical bore of the lock nut 52 is initially coated with a thread locking substance such as Loctite® or equivalent and placed within the second internal cylindrical section 46, preferably alongside in an abutting relation to the thrust slip washer. In initially securing the lock nut 52, the tension bolt 50 is placed internally within the holder body to allow its threaded midsection 76 to intercept and threadably engage the threaded cylindrical bore. Placing one or more shims 206 in between a forward peripheral edge 208 of a capped end 210 of the tension bolt 50 and an annular ledge 212 associated with the second divided section 20 of the holder body 14, tightening the lock nut to the tension bolt to a specified torque setting using the hand-held opposing-prong tool, and removing the shims therefrom after observable curing of the thread locking substance effectively serves to preset the requisite amount of clearance for free rotation of the lock nut and tension bolt sub-assembly that further effects unhindered turning of the tension bolt to engage and disengage from the thrust nut 54. Placement of the spring washers 70 of the type shown in FIGS. 46-48 in a stacked, abutting arrangement relative to the proximal side 52*b* of the lock nut consummates the assembly occupying the second internal cylindrical section 46.

Upon competing the requisite internal assemblies associated with the holder nose and holder body, the holder nose 12 is adaptively connected to the holder body 14 by means of a threaded connection between the threaded end section 94 of the elongated member and the inner threaded bore 96 of the thrust nut 54. Like the external threads of the thrust nut and internal threaded bore of the holder nose, the threaded end section and the inner threaded bore are preferably configured with trapezoidal threads to sufficiently withstand the applied tensional forces and offer a strengthened union while the tension bolt 50 is conditionally tightened to the thrust nut.

As the capped end 210 of the tension bolt is further turned in a clockwise or tightening manner, which simultaneously allows for free rotation of the lock nut 52 therewith, the holder nose 12 is subsequently drawn inward toward the first divided section 18, whereby the inner cylindrical flange 122 slidably engages the interior wall 170 of the second chamber 174 and elastically deforms the annular wall structure 168 a minute amount or furthers a condition of hoop stress while concentrically aligning the holder nose with that of the holder body and forming a strengthened union therebetween. In further respects, the first structural section 82 of the thrust nut will become situated within the structural confines of the third internal cylindrical section 48, particularly noting the alignment of the corresponding geometric configurations associated with the first structural section and first chamber 92 of the third internal cylindrical section.

Continuous turning of the capped end 210 to a specified torque setting sufficiently moves the holder nose 12 to its final resting position relatively to the holder body 14, generally being observed at the moment the annular ridge 156 of the holder nose fully engages and abuts against the annular edge 166 associated with the second chamber 174 and the spring washers 70 engage and deformationally assume the rounded profile of the annular rim 80 associated with the thrust nut. Upon achieving this state of position, the spring washers operably offer a predetermined amount of pre-loading that further effects tensioning of the tension bolt and eliminates the presence of unwanted play or rattle within the assembly of the tool holding apparatus 10 while being mounted within the machine spindle receiver. Flats 214, indents, splines, grooves, as well as other geometric configurations suited to cooperate with a manually operated hand tool, for example, may be respectively present about a peripheral portion 216 of the capped end 210 to facilitate turning of the tension bolt 50 to effect its rotation in the manner noted above while being situated within the confines of the holder body.

Once the holder body 14 has become fully attached to the holder nose 12 in the preferential manner generally depicted in FIG. 2, one or more subassemblies comprising the retention screw 104 and ball 106 is used to retain the position of the thrust nut relatively within the third internal cylindrical section 48 yet allow for limited axial movement therewithin under conditions of tightening and loosening the tension bolt 50, generally sufficing as an arrangement to prevent inadvertent or accidental full release or removal of the tension bolt from the tool holding apparatus 10 during change out of the end mill, for example. In facilitating this arrangement, the ball is initially inserted into the threaded hole 114 to pass therethrough and rest in part within the confines of the groove 116 integrated within the structure of the flat segment 100. Securement of the ball within the groove is furthered by the applied radial force of the retention screw against the spherical portion 106a of the ball, generally by means of threadably engaging the threaded cylindrical body of the retention screw with the threaded hole 114 and tightening it to a specified torque setting, as generally depicted in FIG. 4.

Figure 49:
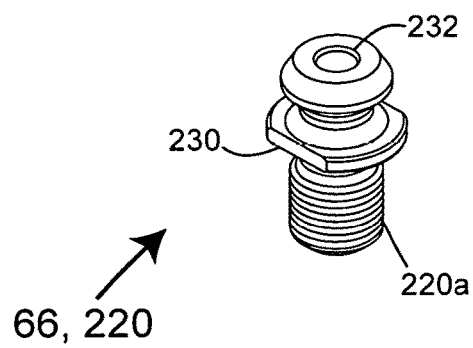
FIG. 49 is a side perspective view of the preferred embodiment of the present invention illustrating a retention knob.
Figure 50:
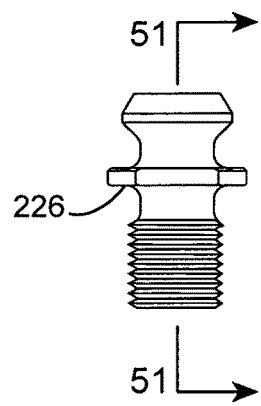
FIG. 50 is a front elevational view of the preferred embodiment of the present invention illustrating a retention knob having a threaded end section and an annular lip.
Figure 51:
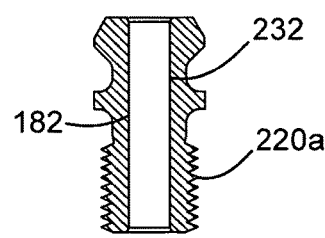
FIG. 51 is a cross sectional view of the preferred embodiment of the present invention taken along lines 51-51 in FIG. 50 illustrating a retention knob configured with an internal passageway.

The tool holding apparatus is further featured and assembled with the interface subassembly 66 that complements operation of integral interfacing means in the nature of a retention knob 220 of the type depicted in FIGS. 49-51 that adaptively interacts with the clamping mechanism of the machine spindle receiver, whereas its association with the tool holding apparatus 10 does not adversely affect or hinder the preferred rotational aspects of the tension bolt 50 to threadably attach and detach the holder nose respectively to and from the holder body 14.

A threaded end section 220a of the retention knob 220 is generally shown in FIG. 4 as being threadably mounted into an equally configured threaded bore 224 of the distal end 62 of the tension bolt 50 and tightened until an annular lip 226 associated with the retention knob abuts against a rearward peripheral edge 228 of the capped end 210. A pair of opposing flat segments 230 integrally associated with the annular lip may further assist in tightening and loosening the retention knob respectively to and from the distal end 62 of the tension bolt by means of a hand-held wrench (not shown) or equivalent form of manual tool that simultaneously engages the opposing flat segments. As illustrated in FIG. 51, the retention knob further incorporates within its structure an internal passageway 232 that yields continuity of coolant flow through the first throughput bore 182 of the centralized axial passageway. It is noted herein that the interface subassembly 66, particularly in the form of the retention knob, may comprise alternative geometric configurations and arrangements other than what is being disclosed herein, particularly as such to adaptively conform to the unique configurations generally offered and dictated by the design of the clamping mechanism associated with the machine spindle receiver.

As it can be seen from the foregoing there is provided in accordance with this invention a simple and easily assembled apparatus that is particularly suited to eliminate occurrences of rotational slip and pullout of the end mill 86 therefrom while maintaining a high degree of concentricity for more accurate and efficient milling of materials commonly used in the manufacture and fabrication of finished parts and components. It is obvious that the components comprising the tool holding apparatus 10 may be fabricated from a variety of materials, providing such selection or use of materials possess the capacity to withstand elevated temperatures and torsional and compressive forces acting thereon throughout its duration of use in an industrial or manufacturing setting. Accordingly, it is most desirable, and therefore preferred, to construct the tool holding apparatus 10, namely, the holder body 14 and holder nose 12, from alloy tool steel, such as H13, A2, S7, or an equivalent type of material, to offer ease in machinability and fabrication, while also extending the life of the machining tool used to manufacture the tool holding apparatus without adversely affecting the inherent mechanical properties of the material of construction and offering a further opportunity to surface harden the material by means of flame or induction hardening, furnace, and by nitriding.

While there has been shown and described a particular embodiment of the invention, it will be obvious to those skilled in the art that various changes and alterations can be made therein without departing from the invention and, therefore, it is aimed in the appended claims to cover all such changes and alterations which fall within the true spirit and scope of the invention.

What is claimed is:

1. A tool holding apparatus for interfacing a machine spindle receiver of a milling machine, said tool holding apparatus comprising, in combination:
   a holder body having integral interfacing means for interfacing and adapting to the machine spindle receiver and a centralized axial bore having first, second, and third internal cylindrical sections;
   a holder nose having an internal threaded bore and an axial bore concentrically aligned therewith, said axial bore having a reverse-tapered configuration formed by the progressive change in diameter between a rearward end and a forward end thereof;
   a thrust nut having an inner threaded bore, a first structural section having a first outward cylindrical surface and being confined in part within said second and third internal cylindrical sections, and a second structural section having a second outward cylindrical surface with external threads for threadably engaging said internal threaded bore of the holder nose;
   a tension bolt being housed within said centralized axial bore and having an elongated member integrally connecting to a distal end, said elongated member having a threaded midsection and a threaded end section threadably engaged with said inner threaded bore of the thrust nut to draw inwardly and hold in place said holder nose relatively to said holder body; and
   a lock nut having a threaded cylindrical bore for threadably engaging said threaded midsection of the elongated member.

2. The tool holding apparatus as set forth in claim 1, wherein said holder body comprises an interior radial shoulder formed by the diametric difference between said first and second internal cylindrical sections.

3. The tool holding apparatus as set forth in claim 2, further comprising a thrust slip washer positioned in between said interior radial shoulder and a distal side of the lock nut.

4. The tool holding apparatus as set forth in claim 1, further comprising a leveling assembly configured for seating a shaft portion of a tool while being positioned within said axial bore, said first structural section of the thrust nut having an annular rim and said second structural section having a radial depression and a threaded bore concentrically aligned therewith for threadably attaching said leveling assembly.

5. The tool holding apparatus as set forth in claim 4, further comprising a plurality of spring washers stackably arranged and collectively situated in between said annular rim and a proximal side of the lock nut.

6. The tool holding apparatus as set forth in claim 4, wherein said leveling assembly comprises a retaining screw and a spherical washer having an orifice, a top annular side with a pronounced rounded profile, and a bottom spherical side with a downward radial bevel for fitment within said radial depression, said retaining screw having a flat head configured with a groove to accept therewithin an o-ring and a threaded sectional end configured to pass through said orifice before being threadably engaged to said threaded bore.

7. The tool holding apparatus as set forth in claim 6, wherein said retaining screw comprises a longitudinal hexagonal bore configured to facilitate assembly of said leveling assembly to said thrust nut and pass coolant therethrough.

8. The tool holding apparatus as set forth in claim 1, wherein said holder body comprises a first divided section integrally connecting to a second divided section and said integral interfacing means comprises a first end progressively enlarging in diameter to a second end to form a tapered exterior surface relatively about said second divided section and a radially projecting v-flange circumferentially dividing said first divided section from said second divided section.

9. The tool holding apparatus as set forth in claim 1, further comprising cooling and lubricating means for delivering and transporting a lubricant during milling operations and an interface subassembly configured to interact with the machine spindle receiver.

10. The tool holding apparatus as set forth in claim 9, further comprising an end mill having a cutter end section integrally connecting to a shaft portion, said shaft portion having a first end and a second end and a tapered profile formed by the progressive change in diameter between said first and second ends, wherein said first end comprises a diameter comparatively larger than that of said second end, said tapered profile geometrically corresponding to said reverse-tapered configuration of the axial bore, whereby threaded engagement of said thrust nut to said holder nose consummates a locking arrangement of said shaft portion within said axial bore.

11. The tool holding apparatus as set forth in claim 10, further comprising rotational inhibiting means for inhibiting inadvertent rotational slip of said shaft portion while being situated within said axial bore.

12. The tool holding apparatus as set forth in claim 11, wherein said rotational inhibiting means comprises three flat sectors equally spaced apart from one another and integrated within said axial bore to geometrically correspond to said shaft portion having three flat trigonal sectors.

13. The tool holding apparatus as set forth in claim 10, wherein said cooling and lubricating means comprises a centralized axial passageway having a first throughput bore, a second throughput bore, and a third throughput bore respectively present in and extending in axial alignment through said interface subassembly, said tension bolt, and said thrust nut and at least three convoluted passages being disposed within and extending longitudinally about said end mill with each of said convoluted passages having an inlet in hydraulic communication with said centralized axial passageway and an outlet present about said cutter end section of the end mill.

14. The tool holding apparatus as set forth in claim 9, wherein said cooling and lubricating means comprises a centralized axial passageway having a first throughput bore, a second throughput bore, and a third throughput bore respectively present in and extending in axial alignment through said interface subassembly, said tension bolt, and said thrust nut and at least three sets of interconnected conduits in hydraulic communication with said third throughput bore and equidistantly arranged from one another about an outer wall structure of the holder nose with each set of said interconnected conduits having a first duct and a second duct respectively configured with an outlet and a set screw.

15. The tool holding apparatus as set forth in claim 9, wherein said interface subassembly is configured as a retention knob having a threaded end section to threadably engage a threaded bore of the distal end and a first throughput bore in axial alignment with said centralized axial bore for yielding passage of coolant therethrough.

16. The tool holding apparatus as set forth in claim 1, further comprising locking means for inhibiting rotational movement of said thrust nut relatively about its longitudinal axis while being partially confined within a first chamber of the third internal cylindrical section.

17. The tool holding apparatus as set forth in claim 16, wherein said locking means comprises three flat segments equally spaced apart from one another and integrated within said first outward cylindrical surface of the first structural section to adaptively fit within an equivalent receiving configuration of the first chamber.

18. The tool holding apparatus as set forth in claim 17, wherein said locking means further comprises a securing subassembly assigned to each of said flat segments, said securing subassembly having a retention screw to threadably engage a threaded hole in vicinity of said third internal cylindrical section, a ball, and a groove integrated within said flat segment, said retention screw comprising a tapered end with a conical depression to engage a spherical portion of the ball, whereby tightening said retention screw radially moves inward an opposing spherical portion of the ball into said groove to prevent turning of said thrust nut while being partially confined within said first chamber.

19. The tool holding apparatus as set forth in claim 1, wherein said holder nose comprises a spiral groove integrated within an outer wall structure thereof and a plurality of pilot bores each being spaced equally apart from one another and substantially extending radially inward a predetermined amount from an outer surface of the holder nose.

20. The tool holding apparatus as set forth in claim 1, wherein said first structural section of the thrust nut comprises an annular rim with a rounded geometric profile and said lock nut comprises a proximal side with a rounded geometric profile.

21. The tool holding apparatus as set forth in claim 20, further comprising a plurality of spring washers stackably arranged and collectively situated in between said annular rim and said proximal side of the lock nut.

22. The tool holding apparatus as set forth in claim 1, wherein said holder nose comprises an inner cylindrical flange with an outer tapered wall and said third internal cylindrical section comprises a first chamber and a second chamber having an interior wall with a tapered configuration, said outer tapered wall having a greater angular pitch than that of said tapered configuration of the interior wall, whereby joining said holder nose to said holder body elastically deforms said inner cylindrical flange and said interior wall a predetermined amount such to further a concentric relationship and strengthen union between said holder nose and said holder body.

23. A tool holding apparatus for interfacing a machine spindle receiver of a milling machine, said tool holding apparatus comprising, in combination:
a holder body having a first divided section integrally connecting to a second divided section and a centralized axial bore having first, second, and third internal cylindrical sections, said second divided section having a first end progressively enlarging in diameter to a second end to form a tapered exterior surface relatively about said second divided section;
a tool having a shaft portion and a cutter end section;
a holder nose having an internal threaded bore and an axial bore concentrically aligned therewith for housing said shaft portion;
axial inhibiting means for inhibiting axial movement of said shaft portion of the tool within said axial bore;
a thrust nut having an inner threaded bore, a first structural section having a first outward cylindrical surface and being confined in part within said second and third internal cylindrical sections, and a second structural section having a second outward cylindrical surface with external threads for threadably engaging said internal threaded bore of the holder nose;
rotational inhibiting means for inhibiting inadvertent rotational slip of said shaft portion of the tool while being situated within said axial bore;
a tension bolt being housed within said centralized axial bore and having an elongated member integrally connecting to a distal end, said elongated member having a threaded midsection and a threaded end section threadably engaged with said inner threaded bore of the thrust nut to draw inwardly and hold in place said holder nose relatively to said holder body; and
a lock nut having a threaded cylindrical bore for threadably engaging said threaded midsection of the elongated member.

24. The tool holding apparatus as set forth in claim 23, further comprising a retention knob having a first throughput bore and a threaded end section configured to threadably engage a threaded bore of the distal end, said tension bolt having a second throughput bore, said thrust nut having a third throughput bore.

25. The tool holding apparatus as set forth in claim 24, wherein said holder nose comprises at least three sets of interconnected conduits in hydraulic communication with said third throughput bore and equidistantly arranged from one another about an outer wall structure of the holder nose with each of said sets of interconnected conduits having a first duct and a second duct respectively configured with an outlet and a set screw.

26. The tool holding apparatus as set forth in claim 24, wherein said tool comprises at least three convoluted passages being disposed therewithin and extending longitudinally thereabout with each of said convoluted passages having an inlet in hydraulic communication with said third throughput bore and an outlet positioned about said cutter end section of the tool.

27. The tool holding apparatus as set forth in claim 23, wherein said rotational inhibiting means comprises three flat sectors equally spaced apart from one another and integrated within said axial bore to geometrically correspond to said shaft portion having three flat trigonal sectors.

28. The tool holding apparatus as set forth in claim 23, wherein said axial inhibiting means comprises a reverse-tapered configuration formed by the progressive change in diameter between a rearward end and a forward end of the axial bore, said shaft portion having a tapered profile geometrically corresponding to said reverse-tapered configuration, whereby threaded engagement of said thrust nut to said holder nose consummates a locking arrangement of said shaft portion within said axial bore.

29. The tool holding apparatus as set forth in claim 23, further comprising a leveling assembly for sufficiently seating said shaft portion of the tool within said axial bore, said first structural section of the thrust nut having an annular rim and said second structural section having a radial depression and a threaded bore concentrically aligned therewith for threadably attaching said leveling assembly.

30. The tool holding apparatus as set forth in claim 29, wherein said leveling assembly comprises a retaining screw and a spherical washer having an orifice, a top annular side with a pronounced rounded profile, and a bottom spherical side with a downward radial bevel for fitment within said radial depression, said retaining screw having a flat head configured with a groove to accept therewithin an o-ring and a threaded sectional end configured to pass through said orifice before being threadably engaged to said threaded bore.

31. The tool holding apparatus as set forth in claim 23, further comprising locking means for inhibiting rotational movement of said thrust nut relatively about its longitudinal axis while being partially confined within a first chamber of the third internal cylindrical section.

32. The tool holding apparatus as set forth in claim 31, wherein said locking means comprises three flat segments equally spaced apart from one another and integrated within said first outward cylindrical surface of the first structural section to adaptively fit within an equivalent receiving configuration of the first chamber.

33. The tool holding apparatus as set forth in claim 32, wherein said locking means further comprises a securing subassembly assigned to each of said flat segments, said securing subassembly having a retention screw to threadably engage a threaded hole in vicinity of said third internal cylindrical section, a ball, and a groove integrated within said flat segment, said retention screw comprising a tapered end with a conical depression to engage a spherical portion of the ball, whereby tightening said retention screw radially moves inward an opposing spherical portion of the ball into said groove to prevent turning of said thrust nut while being partially confined within said first chamber.

34. The tool holding apparatus as set forth in claim 23, wherein said first structural section of the thrust nut comprises an annular rim with a rounded geometric profile and said lock nut comprises a proximal side with a rounded geometric profile.

35. The tool holding apparatus as set forth in claim 34, further comprising a plurality of spring washers stackably arranged and collectively situated in between said annular rim and said proximal side of the lock nut.

36. The tool holding apparatus as set forth in claim 23, wherein said first internal cylindrical section comprises a first sub-cylindrical compartment and a second sub-cylindrical compartment, said holder body comprises an interior radial shoulder formed by the diametric difference between said second sub-cylindrical compartment of the first internal cylindrical section and said second internal cylindrical section.

37. The tool holding apparatus as set forth in claim 36, further comprising a thrust slip washer positioned in between said interior radial shoulder and a distal side of the lock nut.

38. A tool holding apparatus for interfacing a machine spindle receiver of a milling machine, said tool holding apparatus comprising, in combination:
- a holder body having a first divided section integrally connecting to a second divided section and a centralized axial bore having first, second, and third internal cylindrical sections;
- a tool having a shaft portion and a cutter end section;
- a holder nose having an internal threaded bore and an axial bore concentrically aligned therewith for housing said shaft portion;
- axial inhibiting means for inhibiting axial movement of said shaft portion of the tool within said axial bore;
- a thrust nut having an inner threaded bore, a first structural section having a first outward cylindrical surface and being confined in part within said second and third internal cylindrical sections, and a second structural section having a second outward cylindrical surface incorporating external threads for threadably engaging said internal threaded bore of the holder nose;
- rotational inhibiting means for inhibiting inadvertent rotational slip of said shaft portion of the tool while being situated within said axial bore;
- a tension bolt being housed within said centralized axial bore and having an elongated member integrally connecting to a distal end, said elongated member having a threaded midsection and a threaded end section threadably engaged with said inner threaded bore of the thrust nut to draw inwardly and hold in place said holder nose relatively to said holder body; and
- a lock nut having a threaded cylindrical bore for threadably engaging said threaded midsection of the elongated member.

39. The tool holding apparatus as set forth in claim 38, wherein said rotational inhibiting means comprises three flat sectors equally spaced apart from one another and integrated within said axial bore to geometrically correspond to said shaft portion having three flat trigonal sectors.

40. The tool holding apparatus as set forth in claim 38, wherein said axial inhibiting means comprises a reverse-tapered configuration formed by the progressive change in diameter between a rearward end and a forward end of the axial bore, said shaft portion having a tapered profile geometrically corresponding to said reverse-tapered configuration, whereby threaded engagement of said thrust nut to said holder nose consummates a locking arrangement of said shaft portion within said axial bore.

41. The tool holding apparatus as set forth in claim 38, further comprising a leveling assembly for sufficiently seating said shaft portion of the tool within said axial bore, said first structural section of the thrust nut having an annular rim and said second structural section having a radial depression and a threaded bore concentrically aligned therewith for threadably attaching said leveling assembly.

42. The tool holding apparatus as set forth in claim 41, wherein said leveling assembly comprises a retaining screw and a spherical washer having an orifice, a top annular side with a pronounced rounded profile, and a bottom spherical side with a downward radial bevel for fitment within said radial depression, said retaining screw having a flat head configured with a groove to accept therewithin an o-ring and a threaded sectional end configured to pass through said orifice before being threadably engaged to said threaded bore.

43. The tool holding apparatus as set forth in claim 42, further comprising a retention knob having a first throughput bore and a threaded end section configured to threadably engage a threaded bore of the distal end, said tension bolt having a second throughput bore, said retaining screw having a longitudinal hexagonal bore configured as a third throughput bore.

44. The tool holding apparatus as set forth in claim 43, wherein said holder nose comprises at least three sets of interconnected conduits in hydraulic communication with said third throughput bore and equidistantly arranged from one another about an outer wall structure of the holder nose with each of said sets of interconnected conduits having a first duct and a second duct respectively configured with an outlet and a set screw.

45. The tool holding apparatus as set forth in claim 43, wherein said tool comprises at least three convoluted passages being disposed therewithin and extending longitudinally thereabout with each of said convoluted passages having an inlet in hydraulic communication with said third throughput bore and an outlet positioned about said cutter end section of the tool.

46. The tool holding apparatus as set forth in claim 38, further comprising locking means for inhibiting rotational movement of said thrust nut relatively about its longitudinal axis while being partially confined within a first chamber of the third internal cylindrical section.

47. The tool holding apparatus as set forth in claim 46, wherein said locking means comprises three flat segments equally spaced apart from one another and integrated within said first outward cylindrical surface of the first structural section to adaptively fit within an equivalent receiving configuration of the first chamber.

48. The tool holding apparatus as set forth in claim 47, wherein said locking means further comprises a securing subassembly assigned to each of said flat segments, said securing subassembly having a retention screw to threadably engage a threaded hole in vicinity of said third internal cylindrical section, a ball, and a groove integrated within said flat segment, said retention screw having a tapered end with a conical depression to engage a spherical portion of the ball, whereby tightening said retention screw radially moves inward an opposing spherical portion of the ball into said groove to prevent turning of said thrust nut while being partially confined within said first chamber.

49. The tool holding apparatus as set forth in claim 38, wherein said first structural section of the thrust nut comprises an annular rim with a rounded geometric profile and said lock nut comprises a proximal side with a rounded geometric profile.

50. The tool holding apparatus as set forth in claim 49, further comprising a plurality of spring washers stackably arranged and collectively situated in between said annular rim and said proximal side of the lock nut.

51. The tool holding apparatus as set forth in claim 38, wherein said second divided section comprises a first end progressively enlarging in diameter to a second end to form a tapered exterior surface relatively about said second divided section, said holder body having a radially projecting v-flange circumferentially dividing said first divided section from said second divided section.

52. The tool holding apparatus as set forth in claim 38, wherein said first internal cylindrical section comprises a first sub-cylindrical compartment and a second sub-cylindrical compartment, said holder body comprises an interior radial shoulder formed by the diametric difference between said second sub-cylindrical compartment of the first internal cylindrical section and said second internal cylindrical section.

53. The tool holding apparatus as set forth in claim 52, further comprising a thrust slip washer positioned in between said interior radial shoulder and a distal side of the lock nut.

* * * * *